United States Patent
Ting

(10) Patent No.: US 10,644,968 B1
(45) Date of Patent: May 5, 2020

(54) SAMPLING IN SLIDING WINDOWS WITH TIGHT OPTIMALITY AND TIME DECAYED DESIGN

(71) Applicant: Tableau Software, Inc., Seattle, WA (US)

(72) Inventor: Daniel Ting, Seattle, WA (US)

(73) Assignee: Tableau Software, Inc., Seattle, WA (US)

( * ) Notice: Subject to any disclaimer, the term of this patent is extended or adjusted under 35 U.S.C. 154(b) by 232 days.

(21) Appl. No.: 15/838,233

(22) Filed: Dec. 11, 2017

Related U.S. Application Data

(60) Provisional application No. 62/432,524, filed on Dec. 9, 2016, provisional application No. 62/432,491, filed on Dec. 9, 2016, provisional application No. 62/460,709, filed on Feb. 17, 2017.

(51) Int. Cl.
*H04L 12/26* (2006.01)
*H04L 12/861* (2013.01)

(52) U.S. Cl.
CPC .............. *H04L 43/02* (2013.01); *H04L 49/90* (2013.01)

(58) Field of Classification Search
CPC .................................................... G06F 16/285
See application file for complete search history.

(56) References Cited

U.S. PATENT DOCUMENTS

| | | | | |
|---|---|---|---|---|
| 9,734,057 | B2 * | 8/2017 | Choi ................... | G06F 12/0646 |
| 2003/0220066 | A1 * | 11/2003 | Stevenson .......... | B60H 1/00678 |
| | | | | 454/156 |
| 2010/0027959 | A1 * | 2/2010 | Obama ............... | G11B 27/034 |
| | | | | 386/278 |
| 2011/0127976 | A1 * | 6/2011 | Hiltbrunner ........ | H02M 3/1584 |
| | | | | 323/272 |
| 2012/0124294 | A1 * | 5/2012 | Atkisson ............... | G06F 11/108 |
| | | | | 711/135 |
| 2014/0152681 | A1 * | 6/2014 | Sugama ................. | G06T 11/40 |
| | | | | 345/543 |
| 2014/0289387 | A1 * | 9/2014 | Ghosh ................. | H04L 41/0893 |
| | | | | 709/223 |
| 2016/0212213 | A1 * | 7/2016 | Aoki ................... | G06F 11/1402 |

(Continued)

*Primary Examiner* — Moustafa M Meky
*Assistant Examiner* — Sm Z Islam
(74) *Attorney, Agent, or Firm* — Morgan, Lewis & Bockius LLP

(57) ABSTRACT

A method samples a stream of data items. Each data item has an associated timestamp. The method assigns a priority value to each data item. Each data item is represented as a point on a two-dimensional graph whose axes are time and priority. A sliding window covers a predetermined length of time $t_{span}$ and uses a backward probability decay curve to specify what priority values are included in the sliding window. This defines, for a current time $t_c$, a current data sample consisting of data items whose timestamps t fall within the time span $t_c - t_{span} \leq t \leq t_c$ and have priority values below the decay curve. The data sample is stored in a buffer. The process iteratively moves the sliding window forward by a time increment, creating a provisional data sample. When the size of the provisional data sample is too large or too small, the process scales the decay curve.

20 Claims, 15 Drawing Sheets

(56) References Cited

U.S. PATENT DOCUMENTS

| | | | |
|---|---|---|---|
| 2017/0032015 A1* | 2/2017 | Shkapenyuk | G06F 16/285 |
| 2017/0192871 A1* | 7/2017 | Hara | G06F 11/3089 |
| 2017/0299641 A1* | 10/2017 | Tian | G01R 23/16 |

* cited by examiner

Gradually vary at least one of the one or more decay rates by a respective predefined variation until the total number of data items in the subset of the data during the sliding window changes by the first number and matches the size of the data storage buffer (continued) — 818

(B)

Gradually varying at least one of the one or more decay rates is an iterative process further including, while fixing the sampling probability at the start time: — 834

Increase the the one or more decay rates by a first predefined variation — 836

Determining a variation of the total number of data items corresponding to the first predefined variation — 838

When the variation of the total number is greater than the first number, decrease the one or more decay rates by a second predefined variation — 840

The second predefined variation is half of the first predefined variation — 842

When the variation of the total number is not greater than the first number, increase the one or more decay rates by a third predefined variation — 844

Hold the sampling probability at either the start time or the current time — 846

SAMPLING IN SLIDING WINDOWS WITH TIGHT OPTIMALITY AND TIME DECAYED DESIGN

RELATED APPLICATIONS

This application claims priority to U.S. Provisional Application Ser. No. 62/432,524, filed on Dec. 9, 2016, entitled "Sampling in Sliding Window with Tight Optimality and Time Decayed Design," U.S. Provisional Application Ser. No. 62/432,491, filed Dec. 9, 2016, entitled "Generalized Priority Sampling: Designing Good Samples and Deriving Unbiased Estimates," and U.S. Provisional Application Ser. No. 62/460,709, filed Feb. 17, 2017, entitled "Data Sketches for Disaggregated Subset Sum Estimation," each of which is incorporated by reference herein in its entirety.

TECHNICAL FIELD

The disclosed implementations relate generally to computer systems, and more specifically to system features that adaptively sample data in a sliding window to satisfy memory constraints.

BACKGROUND

Many data analysis tasks involve analyzing a process that evolves over time. These tasks span a wide range of problems including financial data, network monitoring, and users' web activity. As the process evolves over time, the data far in the past becomes less relevant, and it is natural to weight recent items more heavily. This weighting, however, does not reduce the size of the data. In many streaming systems (e.g., for financial or network data) data must be ingested and processed at extremely high rates. Coping with these high rates under memory constraints often involves constructing predefined aggregates, sketches that summarize the data, or random samples. Of these methods, sampling is the most flexible. Nearly any question about the data (whether posed beforehand or afterwards) can be answered using sampled data. Statistical or machine learning methods, such as logistic regression, which require data at the item level, can then be applied to the sampled data to answer the questions about the data.

SUMMARY

Accordingly, implementations of the present invention are directed to generating samples using a backward decay design under a memory budget constraint and with amortized constant per item computational complexity. In accordance with the backward decay design, a sampling probability is a function of the age of a data item. Unlike earlier solutions using a uniform sampling probability in a sliding window, implementations of the present invention use generalized priority sampling and draw nearly twice as many samples with the same amount of memory. For a timestamp based data stream with the memory budget constraint, a shift-and-scale priority process is implemented to adjust a backward probability decay curve and sample prioritized data items accordingly. This shift-and-scale priority process can also be used to generate other sampling designs through rejection sampling or importance weighting.

In accordance with some implementations, a data sampling method is implemented at a computer system having one or more processors and memory storing one or more programs configured for execution by the one or more processors. A portion of the memory is allocated as a data storage buffer. The data sampling method includes receiving a data stream including a plurality of data items and assigning a respective priority value to each data item, thereby representing each of the data items as a point on a two-dimensional graph whose axes are time and priority. Each data item has an associated timestamp. The data sampling method further includes defining a sliding window that covers a predetermined length of time $t_{span}$ on the time axis and uses a backward probability decay curve to specify what priority values are included in the sliding window for each time value in the predetermined length of time. This defines, for a current time $t_c$, a current data sample consisting of data items whose timestamps t fall within the time span $t_c - t_{span} \le t \le t_c$ and have priority values below the backward probability decay curve. The data sampling method further includes storing the current data sample in the data storage buffer and iteratively moving the sliding window forward by a time increment $\Delta t$. Specifically, the data sampling method further includes determining a provisional data sample consisting of data items whose timestamps t fall within the time span $t_c - t_{span} + \Delta t \le t \le t_c + \Delta t$ and have priority values below the backward probability decay curve. The data sampling method further includes comparing a size of the provisional data sample to a size of the data storage buffer. When the size of the provisional data sample differs from the size of the data storage buffer, the method incrementally scales the backward probability decay curve to adjust the size of the provisional data sample included in the sliding window so that the size of the provisional data sample matches the size of the data storage buffer. The data sampling method further includes storing the provisional data sample as an updated current data sample in the data storage buffer.

In some implementations, priority values are assigned according to sizes of the data items. In some implementations, each data item corresponds to a respective row in a database table, and the respective size of each data item is specified by a column in the database table. In some implementations, priority values are assigned that are proportional to the sizes of the data items. In some implementations, peak priority values are assigned to data items whose sizes fall within a preferred range of sizes.

In some implementations, the priority values are assigned to the data items randomly or pseudo-randomly.

The backward probability decay curve can have a wide variety of shapes. In general, the backward probability decay curve is continuous and monotonically increasing (or at least monotonically non-decreasing). In some implementations, the backward probability decay curve has an exponential decay rate of the form $f(t) = e^{-(t_c - t)}$. In some implementations, the backward probability decay curve is linear, with a peak value at $t_c$ and reaching zero at $t_c - t_{span}$. In some implementations, the backward probability decay curve stitches together a finite number of continuous segments (e.g., lines). Generally, they are stitched together to form a decay curve that it is continuous, but the decay curve may have "corners" (i.e., points where the curve is not differentiable).

In some implementations, the method further includes, for each of the data items in the updated current data sample, determining a weight according to the timestamp of the respective data item. The method combines the data items in the updated current data sample using the respective weight of each data item.

In some implementations, the method includes, prior to incrementally scaling the backward probability decay curve, determining a predefined variation for a decay rate of the backward probability decay curve. The predefined variation causes the size of the provisional data sample to change by a predefined unit number (e.g., one). Incrementally scaling the backward probability decay curve further includes gradually varying the decay rate of the backward probability decay curve using the predetermined variation until the size of the provisional data sample matches the size of the data storage buffer.

In some implementations, incrementally scaling the backward probability decay curve is an iterative process that includes: (1) lifting up the backward probability decay curve from one end of the moved sliding window, including increasing a decay rate of the backward probability decay curve by a first predefined variation; (2) determining the size of the provisional data sample corresponding to the first predefined variation of the decay rate; (3) when the size of the provisional data sample is greater than the size of the data storage buffer, lowering down the backward probability decay curve from the one end, including decreasing the decay rate of the backward probability decay curve by a second predefined variation; and (4) when the size of the provisional data sample is less than the size of the data storage buffer, lifting up the backward probability decay curve from the one end, including increasing the decay rate of the backward probability decay curve by a third predefined variation. In some implementations, the second predefined variation is half of the first predefined variation.

In some implementations, incrementally scaling the backward probability decay curve includes fixing the backward probability decay curve at one of two end times $t_c + \Delta t$ and $t_c - t_{span} + \Delta t$ of the sliding window.

In some implementations, the time increment $\Delta t$ corresponds to a sampling resolution associated with the data stream. For example, the data stream may be sampled every millisecond, or every ten milliseconds. In other implementations, the sampling resolution is much larger, such as minutes, hours, or days.

In some implementations, the sliding window includes two or more temporal regions, and the backward probability decay curve decays backward with two or more decay rates. Each of the two or more decay rates is associated with a respective temporal region. In some implementations, incrementally scaling the backward probability decay curve further includes simultaneously varying the two or more decay rates by a same single proportionality factor. In some implementations, a subset (e.g., a proper subset) of the two or more decay rates is varied to match the size of the provisional data sample to the size of the data storage buffer.

In accordance with some implementations, a computer system has one or more processors and memory. The memory stores one or more programs configured for execution by the one or more processors. The memory also includes a data storage buffer allocated to store sampled data items. The one or more programs include instructions for performing any of the methods described herein.

In accordance with some implementations, a non-transitory computer readable storage medium stores one or more programs configured for execution by a computer system having one or more processors and memory. The memory includes a data storage buffer allocated to store sampled data items. The one or more programs include instructions for performing any of the methods described herein.

Both the foregoing general description and the following detailed description are exemplary and explanatory, and are intended to provide further explanation of the invention as claimed.

BRIEF DESCRIPTION OF THE DRAWINGS

For a better understanding of the aforementioned systems and methods of data sampling, reference should be made to the Description of Implementations below, in conjunction with the following drawings, in which like reference numerals refer to corresponding parts throughout the figures.

FIGS. 8A-8D provide another flow chart of a data sampling method in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Some processes generate continuous streams of data, which can be very large. Because of the size, and the fact they are continuously changing, it can be difficult to provide accurate reports about the data. Some systems compute specific aggregations, which inherently limit what questions can be asked about the data. Other systems select samples of the data. However, if the sampling is not done well, the sample may not be representative of the actual data. In addition, systems typically are not very efficient with memory use, and therefore select smaller samples.

The techniques described here select good samples, and are better able to fully utilize available memory (e.g., two to four times the number of samples of a typical system).

Figure 1:
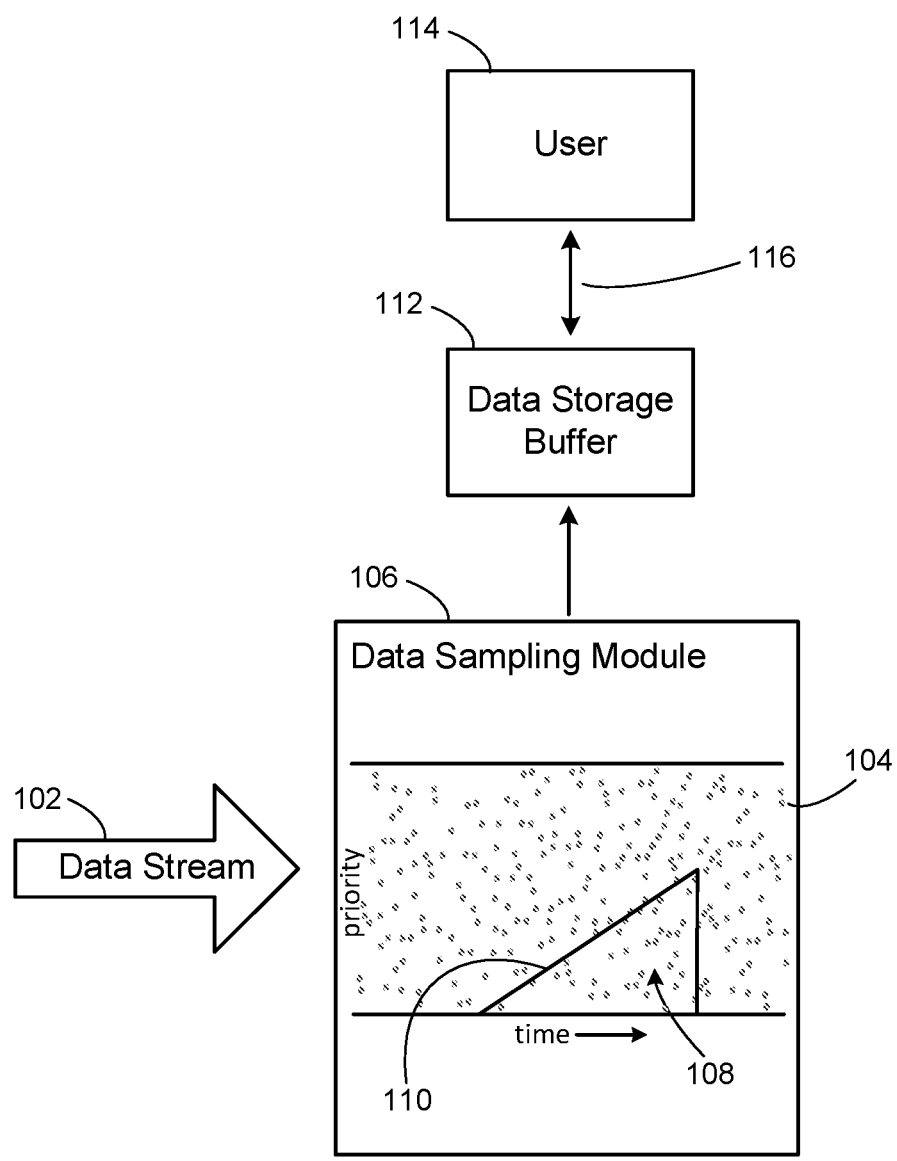
FIG. 1 illustrates a context in which some implementations operate.

As illustrated in FIG. 1, a data stream 102 is received by a data sampling module 106 (e.g., running on a computing system 200). The data stream consists of a large number of data items 104. Note that the number of data items 104 received during a unit of times is not fixed, and can vary substantially. For example, if the data stream represents network traffic, there can be a spike in the data items at specific times (e.g., after a natural disaster or a political announcement).

The data sampling module 106 use a sliding window 108 to select which data items are used for the sample. In the example shown in FIG. 1, the sliding window 108 is a triangle. More generally, the sliding window has a fixed width (length of time) and uses a backward probability decay curve 110 (older items are less likely to be selected).

The data items selected are stored in the data storage buffer 112. In some implementations, entire data items are stored in the buffer. In other implementations, the buffer 112 stores pointers or identifiers of the data items, and the actual data items are stored elsewhere (e.g., in a large database). In some implementations, the data stream is received in a database, and the sampling is performed from the database. Note that the database may be stored on the same computing device as the buffer 112, may be distributed to a plurality of different locations, or may be stored in the cloud on an unknown number of computing devices.

A user 114 can run queries 116 against the buffer 112 to answer questions about the data stream. Note that the queries are not "repeatable" because the buffer 112 is changing. The same query may return different results even milliseconds later.

In some implementations, the user 114 accesses a data visualization application 222, which the user uses to create data visualizations from the buffer (and may also use one or more desktop data sources 224 and/or the relational databases 226).

The sampled data items cover a length of time $t_{span}$ ranging from a current time $t_c$ backward to a start time $t_c - t_{span}$ which precedes the current time $t_c$. In some implementations, the sliding window 108 has a predetermined width that is fixed over time. As time goes on, the sliding window moves with the current time $t_c$.

As illustrated in FIG. 1, each data item 104 has an associated time value (e.g., a timestamp when the data items was created, saved in the database, or received at the data sampling module). Each data item 104 also has an assigned priority. In some implementations, the priority is assigned randomly or pseudo-randomly. In other implementations, the priority for a data item 104 is based (at least in part) on one or more attributes of the data item 104. For example, each data may have a set of several attributes, and one of the attributes is designated as the "size" of the data item. In some implementations, priority is directly proportional to size. In other implementations, priority is determined by size, but not proportionately. In some implementations, priorities are assigned based on two or more attributes of the data items. In some implementations, priority values range from 0.00 to 1.00, with values closer to zero representing a higher probability of being selected.

The two-dimensional sliding window 108 determines which data items to select based on the timestamp and priority of each data item 104. In particular, if the sliding window spans the range from $t_c - t_{span}$ to $t_c$ and uses a decay curve defined by a function $f$, then a data item with timestamp t and priority p is in the sliding window when $t_c - t_{span} \leq t \leq t_c$ and $p \leq f(t)$.

When the sliding window moves with a current time, but the sampling probabilities for the data items remain unchanged, the total number of data items to be sampled from the sliding window varies. The total number may not match the size of the data storage buffer. In some situations, the total number of data items 104 to be sampled exceeds the size of the data storage buffer (e.g., when there is a spike in the number of data items). In other situations, the total number of data items 104 to be sampled is less than the size of the data storage buffer. The sampling probability decay curve 110 for the sliding window decays backward at one or more decay rates with respect to a time when each data item of the subset of sampled data items is generated or received.

To adjust the size of the sample, at least one of the decay rates is gradually varied until the total number of sampled data items matches the size of the data storage buffer. In some implementations, the data sampling module 106 determines a first number of data items that need to be added or removed to match the size of the data storage buffer, and gradually varies at least one of the decay rates of the decay curve 110 to reach the first number of data items.

In some implementations, the sliding window is defined to cover a predetermined length of time $t_{span}$ on the time axis and uses a backward probability decay curve 110 to specify what priority values are included in the sliding window for each time value in the predetermined length of time, thereby defining, for a current time $t_c$, a current data sample consisting of data items whose timestamps t fall within the time span $t_c - t_{span} \leq t \leq t_c$ and have priority values below the backward probability decay curve. The current data sample is stored in the data storage buffer. The sliding window is iteratively moved forward by a time increment $\Delta t$. Specifically, the data sampling module 106 determines a provisional data sample consisting of data items whose timestamps t fall within the time span $t_c - t_{span} + \Delta t \leq t \leq t_c + \Delta t$ and have priority values below the backward probability decay curve 110, and compares the size of the provisional data sample to the size of the data storage buffer. When the size of the provisional data sample differs from the size of the data storage buffer, the backward probability decay curve 110 is incrementally scaled to adjust the size of the provisional data sample included in the sliding window so that the size of the provisional data sample matches the size of the data storage buffer. The provisional data sample is stored as an updated current data sample in the data storage buffer.

Figure 2:
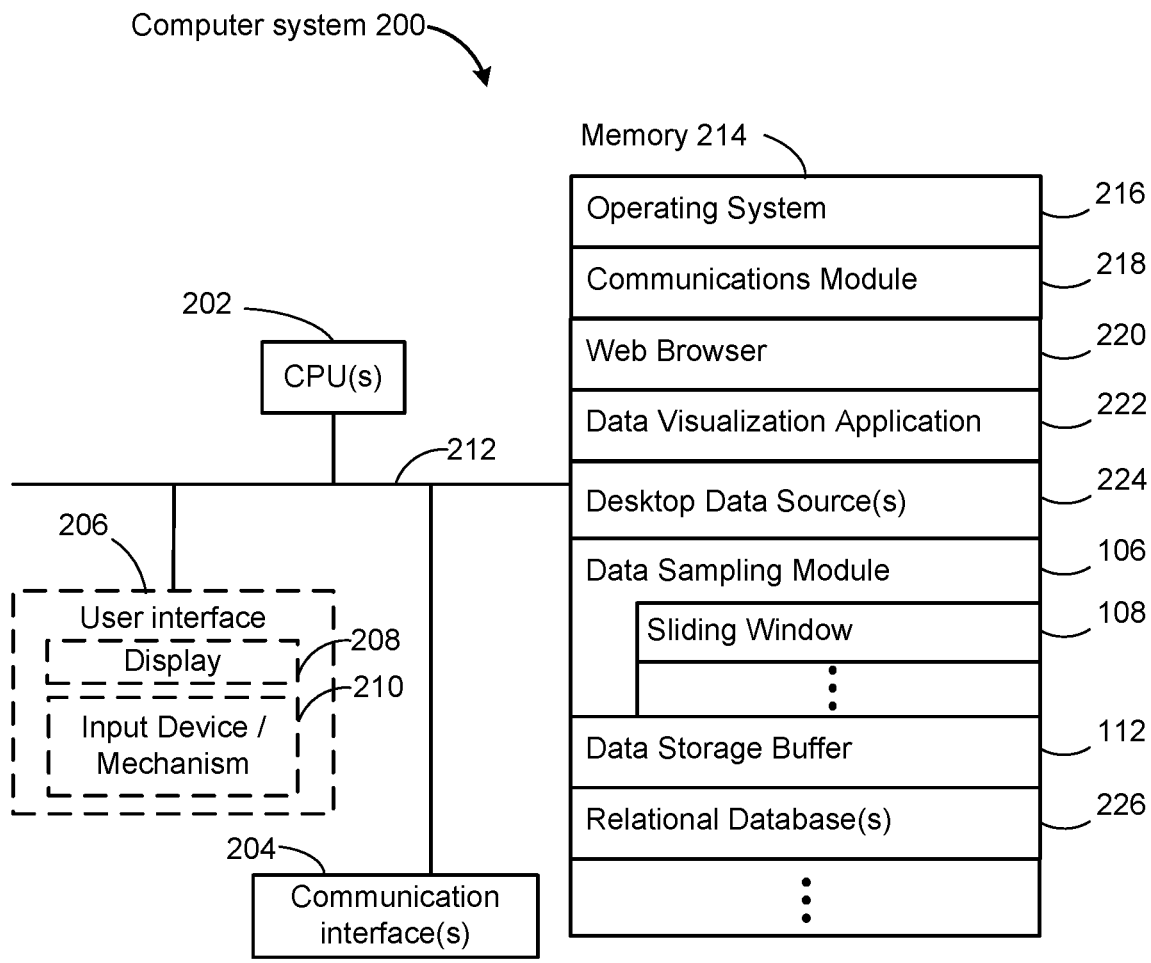
FIG. 2 is a block diagram illustrating a computer system 200 in accordance with some implementations.

FIG. 2 is a block diagram illustrating a computer system 200 in accordance with some implementations. As used herein, the term "computer system" includes personal devices, servers (such as a database server or a data visualization server), or both. The computer system 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computer system 200 may include a user interface 206 including a display device 208 and one or more input devices/mechanisms 210. In some implementations, the input device/mechanism 210 includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 include a touch screen display (also called a touch sensitive display). In some implementations, the memory 214 includes high-speed random-access memory, such as DRAM, SRAM, DDR RAM, or other random access solid state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPU(s) 202. The memory 214, or alternatively the non-volatile memory device(s) within the memory 214, includes a computer readable storage medium.

In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computer system 200 to other computers and devices via the one or more communication network interfaces 204 (wired or wireless) and one or more communication networks, such as the Internet, other wide area networks, local area networks, metropolitan area networks, and so on;
- a web browser 220 (or other client application), which enables a user to communicate over a network with remote computers or devices. In some implementations, the web browser 220 executes a data visualization web application (not shown) downloaded from a data visualization server. In some implementations, a data visualization web application (not shown) is an alternative to storing a data visualization application 222 locally;
- a data visualization application 222, which enables users to construct data visualizations from various data sources. The data visualization application 222 retrieves data from one or more data sources, such as the data storage buffer 112, a desktop data source 224 (e.g., a CSV file or flat file), a relational database 226 stored locally, or a desktop data source or relational database stored on another device (such as a personal device, a data visualization server, or a database server). The data visualization application then generates and displays the retrieved information in one or more data visualizations;
- zero or more desktop data sources 224, which have data that may be used and displayed by the data visualization application 222. Data sources 224 can be formatted in many different ways, such as spreadsheets, XML files, flat files, CSV files, text files, JSON files, or desktop database files. Typically, the desktop data sources 224 are used by other applications as well (e.g., a spreadsheet application);
- a data sampling module 106, which receives a data stream 102 including a plurality of data items 104, determines a sliding window 108 and a sampling priority value for each data item 104 received, uses a backward probability decay curve 110 to select sample data items, stores the current data sample in the data storage buffer 112, including data items 104 sampled in the sliding window according to the backward probability decay curve 110, and iteratively moves the sliding window forward by a time increment (e.g., by incrementally scaling the backward probability decay curve to adjust the size of a provisional data sample included in the sliding window to match the size of the data storage buffer); and
- one or more relational databases 226, which store collections of related data organized according to a predetermined data structure and can be accessed by a database engine using database queries. In some implementations, the relational databases 226 include collections of tables, views, stored procedures, and other database objects.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 214 stores a subset of the modules and data structures identified above. Furthermore, in some implementations, the memory 214 stores additional modules or data structures not described above.

Although FIG. 2 shows a computer system 200, FIG. 2 is intended more as a functional description of the various features that may be present rather than as a structural schematic of the implementations described herein. In practice, and as recognized by those of ordinary skill in the art, modules shown separately could be combined and some modules could be separated.

FIGS. 3A-3D illustrate sliding windows 108 during which data items are sampled according to backward probability decay curves 302-312 in accordance with some implementations. In accordance with some implementations, the computer system 200 receives a data stream 102 including a plurality of data items 104. The data stream may be to monitor, for example, financial transactions, network performance, or web browsing activities. Each data item 104 of the data stream 102 is associated with a timestamp indicating a time when the respective data item was generated or received. The computer system 200 includes a data storage buffer 112, which has a predetermined size and can only store a subset, rather than all, of the data items in the data stream. The sliding window 108 is associated with a current time $t_c$ and covers a length of time $t_{span}$ ranging from the current time $t_c$ backward to a start time $t_p$, which precedes the current time $t_c$. Note that $t_p$ is equal to $t_c-t_{span}$. In the vertical direction, the sliding window 108 is bounded below by the x-axis and bounded above by the backward probability decay curve. At the current time $t_c$, a subset of data items has been received by the computer system 200. Among the subset of data items, a portion of the subset is sampled and stored in the data storage buffer 112 by the computer system 200. In an example, the sliding window 108 lasts for a length of time of 30 minutes, and a portion of a subset of data items generated during the past 30 minutes is sampled by the computer system 200 for storage in the data storage buffer.

Each data item is assigned a respective priority value. It is represented as a point on a two-dimensional graph whose axes are time and priority. For example, in FIGS. 3A-3D, a data item having a lower priority value is associated with a higher probability of being sampled. When a data item is located below the backward probability decay curve, it is included in the sliding window. The backward probability decay curve decays backward at one or more decay rates.

Figure 3A:
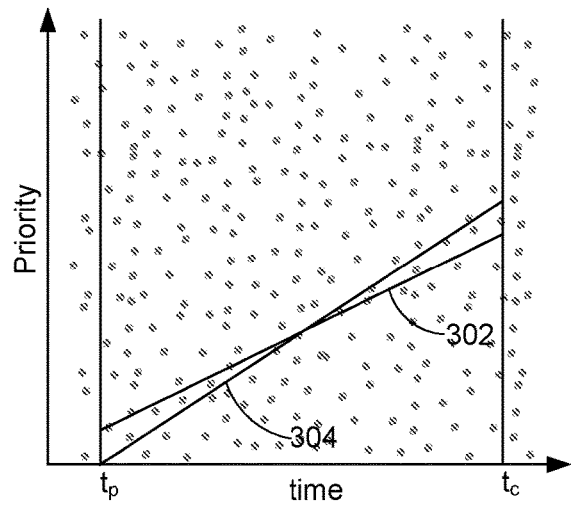
FIGS. 3A-3D are example sliding windows during which data items are sampled according to backward probability decay curves in accordance with some implementations.

Referring to FIG. 3A, in some implementations, the backward probability decay curves 302 and 304 decay linearly and backward with a single decay rate from the current time $t_c$ to the start time $t_p$. In some implementations, the backward probability decay curve 302 does not drop to zero. In some implementations, the backward probability decay curve 304 drops to zero or below a first probability threshold that is substantially low. Few data items (if any) are selected near the start time $t_p$.

Figure 3B:
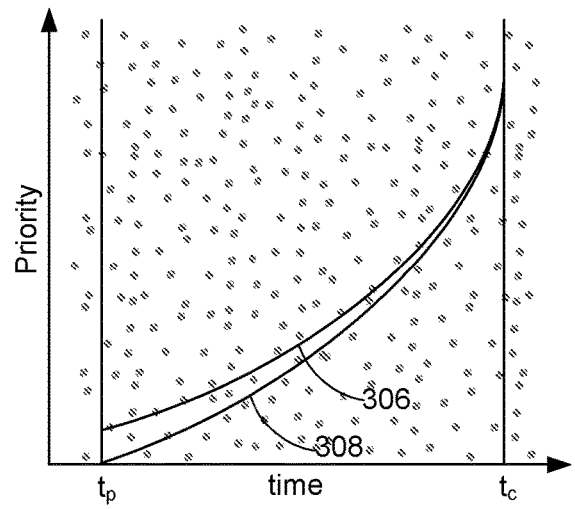

Referring to FIG. 3B, in some implementations, the backward probability decay curves 306 and 308 decay backward with a non-linear decay rate (e.g., an exponential or parabolic decay rate) from the current time $t_c$ and the start time $t_p$. For example, the backward probability decay curve has an exponential decay rate of the form $f(t)=e^{-(t_c-t)}$. In some implementations, the backward probability decay curve 306 drops to a predetermined priority value. In some implementations, the backward probability decay curve 308 drops exponentially below a second probability threshold that is substantially low (i.e., approximately zero).

Figure 3C:
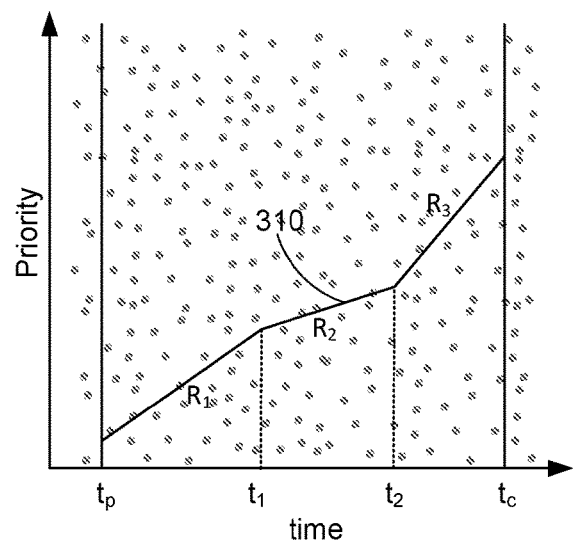
Figure 3D:
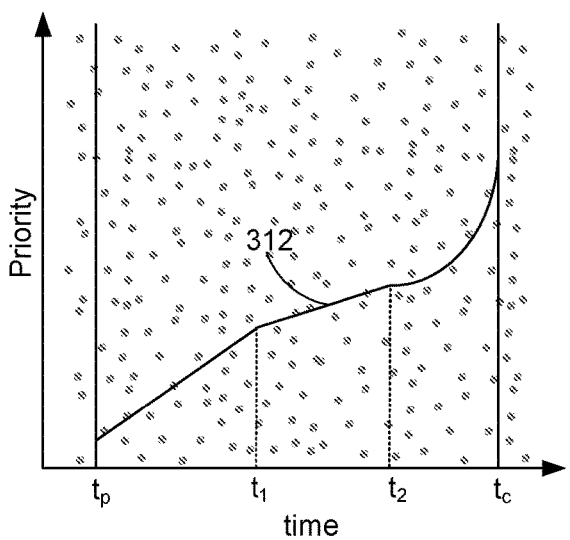

Referring to FIG. 3C, in some implementations, the backward probability decay curve 310 decays linearly and backward with more than one decay rate (e.g., three) from the current time $t_c$ to the start time $t_p$. For example, the sliding window includes three temporal regions divided by a first time $t_1$ and a second time $t_2$. The backward probability decay curve 310 decays backward at a first decay rate $R_1$ in a first temporal region between $t_p$ and $t_1$, at a second decay rate $R_2$ in a second temporal region between $t_1$ and $t_2$, and at a third decay rate $R_3$ in a third temporal region between $t_2$ and $t_c$. The second decay rate $R_2$ is distinct from both the first and third decay rates $R_1$ and $R_3$. Further, referring to FIG. 3D, in some implementations, at least one of the decay rates is a non-linear decay rate (e.g., an exponential or parabolic decay rate). In some implementations, the backward probability decay curve 310 or 312 drops to zero or below a third probability threshold that is substantially low, such that few data items (if any) are selected at the start time $t_p$.

In some implementations, the backward probability decay curve is continuous in the sliding window 108. The first time $t_1$ divides the first and second temporal regions having different decay rates, and the priority values immediately before and after $t_1$ vary smoothly from the first temporal region to the second temporal region. In some implementations not shown in FIGS. 3A-3D, the backward probability decay curve is discontinuous at a time that divides the sliding window 108 to temporal regions having distinct decay rates. The priority values that are immediately before and after $t_1$ vary abruptly from the first temporal region to the second temporal region.

It is noted that in some implementations, each time (e.g., $t_c$, $t_p$, $t_1$ and $t_2$) in the sliding window 108 is identified by a timestamp and represents a respective time slot including the respective time. Data items generated or received during the respective time slot are associated with the time and the corresponding timestamp. In some implementations, the sliding window 108 includes a plurality of time slots, and each time slot is identified by a corresponding timestamp and corresponds to one or more data items. Each of the one or more data items has a priority value indicating a priority of being sampled within the respective time slot. In an example, a data item having a lower priority value is associated with a higher probability of being sampled.

In some implementations, the priority values are assigned to the data items in the sliding window 108 randomly or pseudo-randomly. In some implementations, each data item includes one or data elements that are structured and stored in a row of a database table. In some implementations, a respective priority value is assigned to each data item according to a subset of the data elements (e.g., a data element associated with a stock price). In some implementations, the respective priority value is assigned to each data item according to an attribute of the data item. The respective priority value for each data item is assigned according to a value associated with the attribute of the respective data item. In some implementations, a peak priority value is assigned to data items whose values associated with the attribute fall within a preferred range of characteristic values. In some embodiments, the respective priority value assigned to each data item is proportional to the value associated with the attribute of the respective data item. Specifically, in some implementations (e.g., in a network monitoring application), each data item corresponds to a respective data packet, and the respective priority value is assigned to each data item according to the size of the respective data packet. For example, the respective priority value assigned to each data item is proportional to the size of the respective data packet. In some implementations, a peak priority value is assigned to data items whose data packets have sizes that fall within a preferred range of packet size, which makes data packets having a preferred size have a higher probability of being sampled.

Figure 4A:
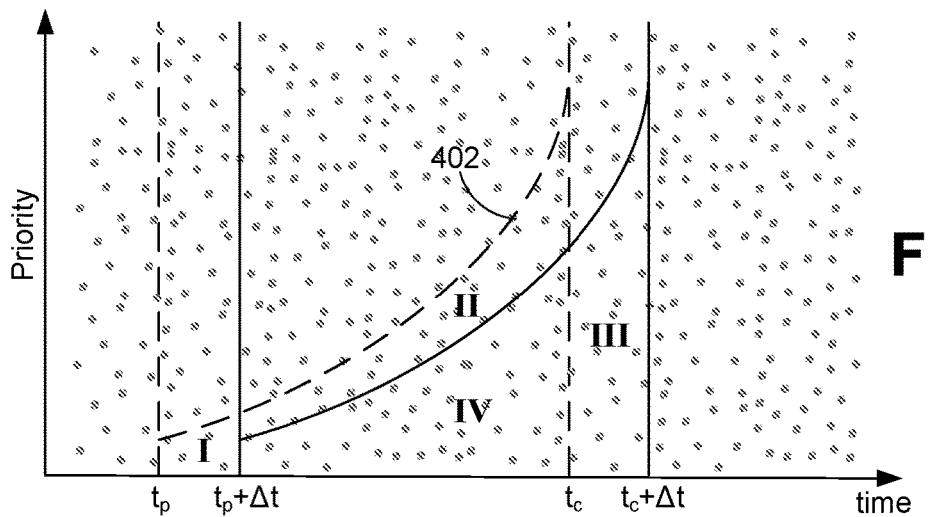
FIGS. 4A-4C are example sliding windows that temporally shift in accordance with some implementations.
Figure 4B:
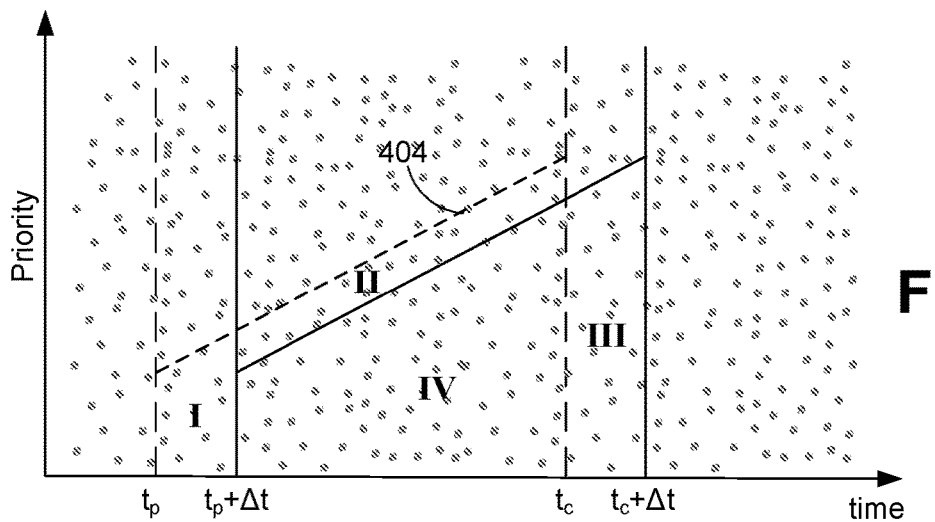
Figure 4C:
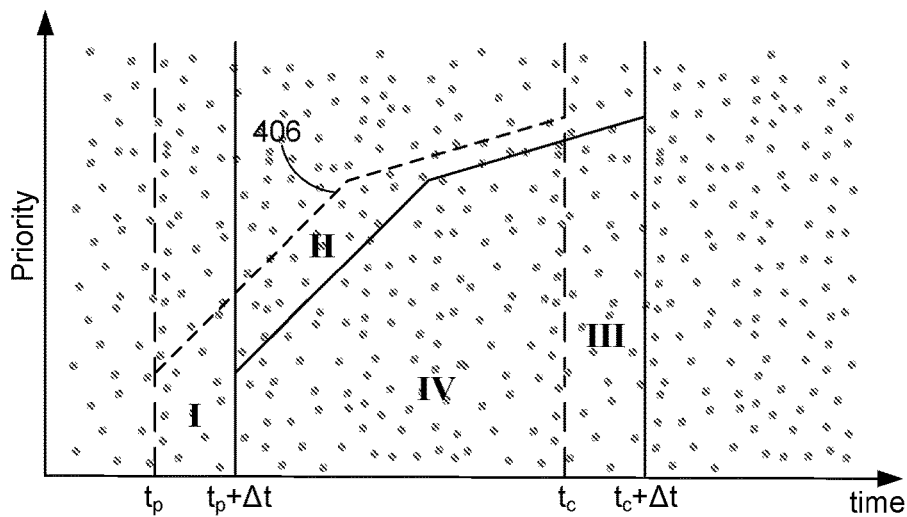

FIGS. 4A-4C illustrate sliding windows 108 that temporally shift in accordance with some implementations. Each of the sliding windows 108 has a predetermined width, and covers a length of time $t_{span}$ ranging from a start time $t_p$ to a current time $t_c$. Note that $t_p$ is equal to $t_c - t_{span}$. As time progresses by a time increment $\Delta t$, the respective sliding window 108 shifts to cover a duration of time lasting from a new start time $t_p + \Delta t$ to a new current time $t_c + \Delta t$, while maintaining the predetermined length of time $t_{span}$. In some implementations, the time increment $\Delta t$ corresponds to a sampling resolution associated with the data stream, and the new current time $t_c + \Delta t$ is a sampling time immediately subsequent to the current time $t_c$. In some implementations, at the new current time $t_c + \Delta t$, the backward probability decay curve (402, 404, or 406) shifts with the sliding window 108. That is, it remains unchanged for each sampling time in the sliding window 400. However, the decay curve may be scaled after the shift to account for changes in the data item distribution. Referring to FIGS. 4A-4C, in some implementations, the backward probability decay curves 402, 404, and 406 decay backward at a non-linear decay rate, a single linear decay rate, and a combination of two linear decay rates, respectively.

As illustrated in each of FIGS. 4A, 4B, and 4C, moving the sliding window 108 by an amount $\Delta t$ changes which data items are including the current sample. The changes to the sample are illustrated by the four labeled regions I, II, III, and IV. The data items in the first region I were in the previous sample, but are not in the current sample because they are now outside the time span of the sliding window. The data items in the second region II are excluded from the current data sample, but for a different reason. Even though the timestamps for these data items are still within the time span of the sliding window, they are now above the backward probability decay curve (402, 404, or 406).

The data items in third region III are added to the new sample because they are in the new time window and are below the backward probability decay curve. Finally, the data items in fourth region IV remain in the sample. The data items in fourth region satisfied the criteria for inclusion in the sample both before and after moving the sliding window 108.

When the total number is calculated for the data items below the backward probability decay curve in the sliding window 400 that has shifted, the total number may vary due to the shift of the sliding window 400.

In some implementations, the data storage buffer of the computer system 200 has a predetermined size. At the time $t_c$, the total number of data items that are sampled and stored in association with the sliding window 108 matches the predetermined size of the data storage buffer, thereby filling the data storage buffer. When the backward probability decay curve shifts with the sliding window 108 as shown in FIGS. 4A-4C, the total number of data items to be sampled and stored in association with the sliding window 108 may increase or decrease, thereby causing either an overflow of the sampled data items or leaving part of the data storage buffer unfilled. At the time $t_c+\Delta t$, the backward probability decay curve is adjusted to match the total number of data items that are sampled and stored in the data storage buffer.

It is noted that when the backward probability decay curve shifts with the sliding window 108 by the time increment $\Delta t$, the data items below the shifted backward probability decay curve form a provisional data sample. The backward probability decay curve is incrementally scaled to remove data items from or add data items into the provisional data sample for the purposes of filling the data storage unit.

Figure 5A:
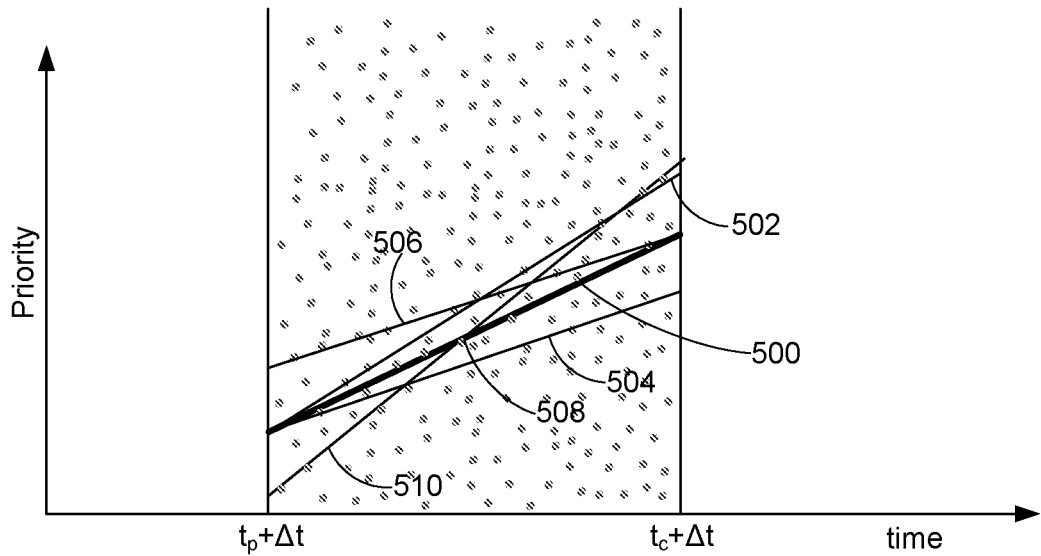
FIGS. 5A and 5B are example backward probability decay curves that are varied in a sliding window to match a size of a data storage buffer in accordance with some implementations.
Figure 5B:
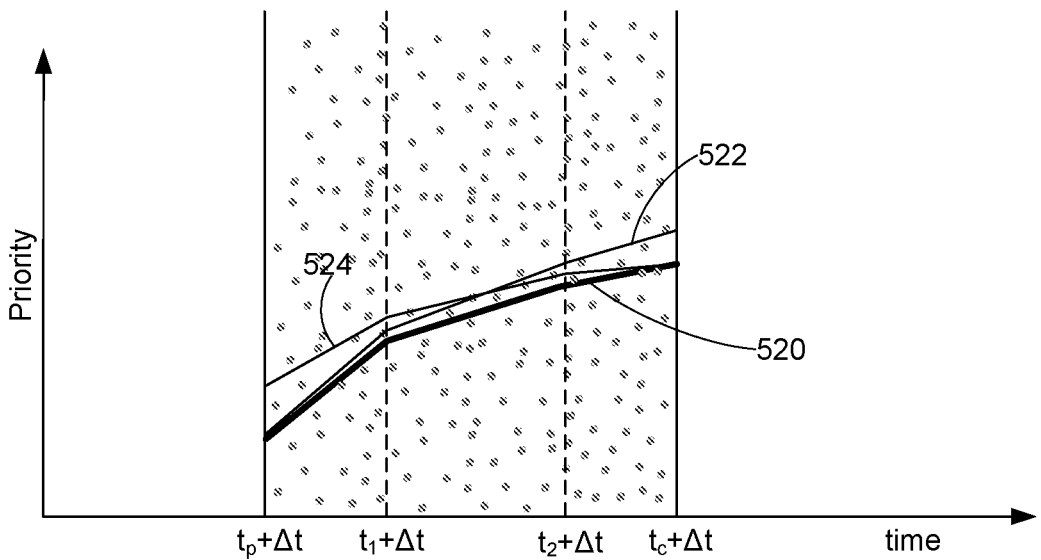

FIGS. 5A and 5B illustrate varying backward probability decay curves in a sliding window in order to match the size of a data storage buffer. As explained above, when a backward probability decay curve shifts with a sliding window without any adjustment, the total number of data items to be sampled and stored may increase or decrease. When the total number of data items to be sampled and stored is compared with the predetermined size of the data storage buffer allocated to store the sampled data items (e.g., the provisional data sample), the computer system 200 determines a first number of data items that need to be added or removed. The initial backward probability decay curves 500 and 520 are adjusted in the shifted sliding window to add or remove the first number of data items.

When the sliding window moves forward by a time increment $\Delta t$, a provisional data sample consist of data items whose timestamps t fall within the time span $t_c-t_{span}+\Delta t \leq t \leq t_c+\Delta t$ and have priority values below the shifted backward probability decay curve 500 or 520. The size of the provisional data sample (i.e., the total number of data items to be sampled and stored) is compared to the size of the data storage buffer. The backward probability decay curve 500 or 520 is then incrementally scaled to remove or add the first number of data items from the provisional data sample. After the adjustment of the backward probability decay curve, the provisional data sample is stored as an updated current data sample in the data storage buffer.

Referring to FIG. 5A, in some implementations, the backward probability decay curve 500 decays backward at a single decay rate (e.g., a linear decay rate or an exponential decay rate). The sliding window covers a length of time $t_{span}$ ranging from a start time $t_p+\Delta t$ to a current time $t_c+\Delta t$. In some implementations, the backward probability decay curve 500 is fixed at the start time $t_p+\Delta t$, and varied to increase or decrease the total number of data items to be sampled (i.e., the size of the provisional data sample) by the first number. For example, with an end fixed at the start time $t_p+\Delta t$, the backward probability decay curve 500 is lifted up to the backward probability decay curve 502 to increase the total number of data items to be sampled by the first number, or pushed down to the backward probability decay curve 504 to decrease the total number to be sampled by the first number. Alternatively, in some implementations, the backward probability decay curve 500 is fixed at the current time $t_c$, and varied to increase or decrease the total number of data items to be sampled by the first number. For example, the backward probability decay curve 500 is lifted to the backward probability decay curve 506 to increase the total number of data items to be sampled by the first number. Further, in some implementations, the backward probability decay curve 500 is fixed at a middle point (e.g., a center point 508), and varied to increase or decrease the total number of data items to be sampled by the first number. For example, the backward probability decay curve 500 is adjusted to the backward probability decay curve 510 to increase the total number of data items to be sampled by the first number.

Referring to FIG. 5B, in some implementations, the backward probability decay curve 520 decays backwards at two or more decay rates (e.g., three linear decay rates). The backward probability decay curve 520 decays backward at a first decay rate $R_1$ in a first temporal region between $t_p+\Delta t$ and $t_1+\Delta t$, at a second decay rate $R_2$ in a second temporal region between $t_1+\Delta t$ and $t_2+\Delta t$, and at a third decay rate $R_3$ in a third temporal region between $t_2+\Delta t$ and $t_c+\Delta t$. In some implementations, the backward probability decay curve 520 is fixed at the start time $t_p+\Delta t$, and varied to increase or decrease the total number of data items to be sampled (e.g., the size of the provisional data sample) by the first number. For example, with an end fixed at the start time $t_p+\Delta t$, the backward probability decay curve 500 is lifted to the backward probability decay curve 522 to increase the total number of data items to be sampled by the first number. Alternatively, in some implementations, the backward probability decay curve 520 is fixed at the current time $t_c$, and varied to increase or decrease the total number of data items to be sampled by the first number. For example, the backward probability decay curve 520 is lifted to the backward probability decay curve 524 to increase the total number of data items to be sampled by the first number. In some implementations (not illustrated), the two of more decay rates of the backward probability decay curve 520 are varied proportionally. In some implementations, the two or more decay rates of the backward probability decay curve 520 are varied by the same amount.

In some implementations, a subset of the two or more decay rates of the backward probability decay curve 520 (e.g., only the third decay rate $R_3$) is varied to increase or decrease the total number of data items to be sampled. In an example, the first decay rate $R_1$ is varied, and the second and third decay rates remain unchanged. The number of data items sampled between $t_1+\Delta t$ and $t_c+\Delta t$ increases because the backward probability decay curve 520 has been lifted up at $t_1$.

Figure 6A:
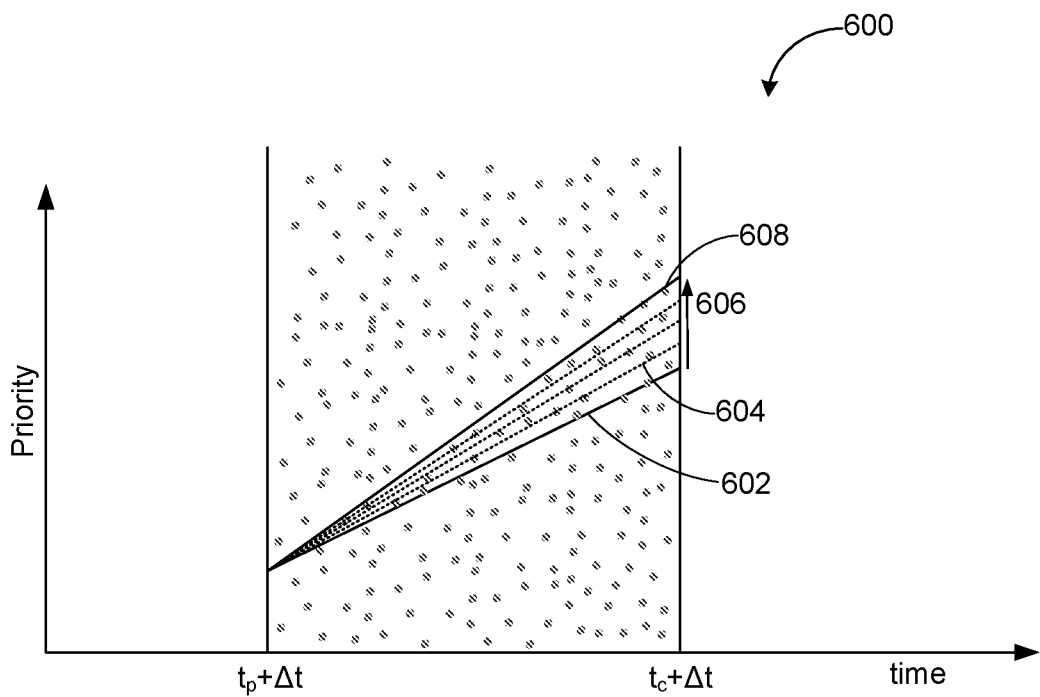
FIGS. 6A and 6B are two example processes of gradually varying a backward probability decay curve in a sliding window to match a size of a provisional data sample to a size of a data storage buffer in accordance with some implementations.
Figure 6B:
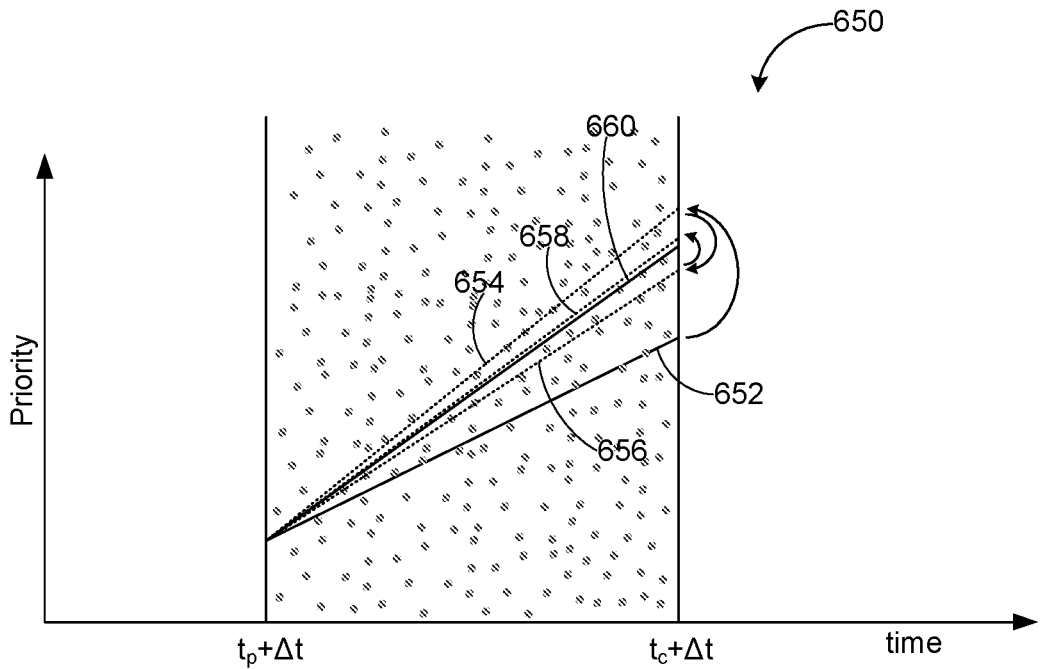
Figure 7A:
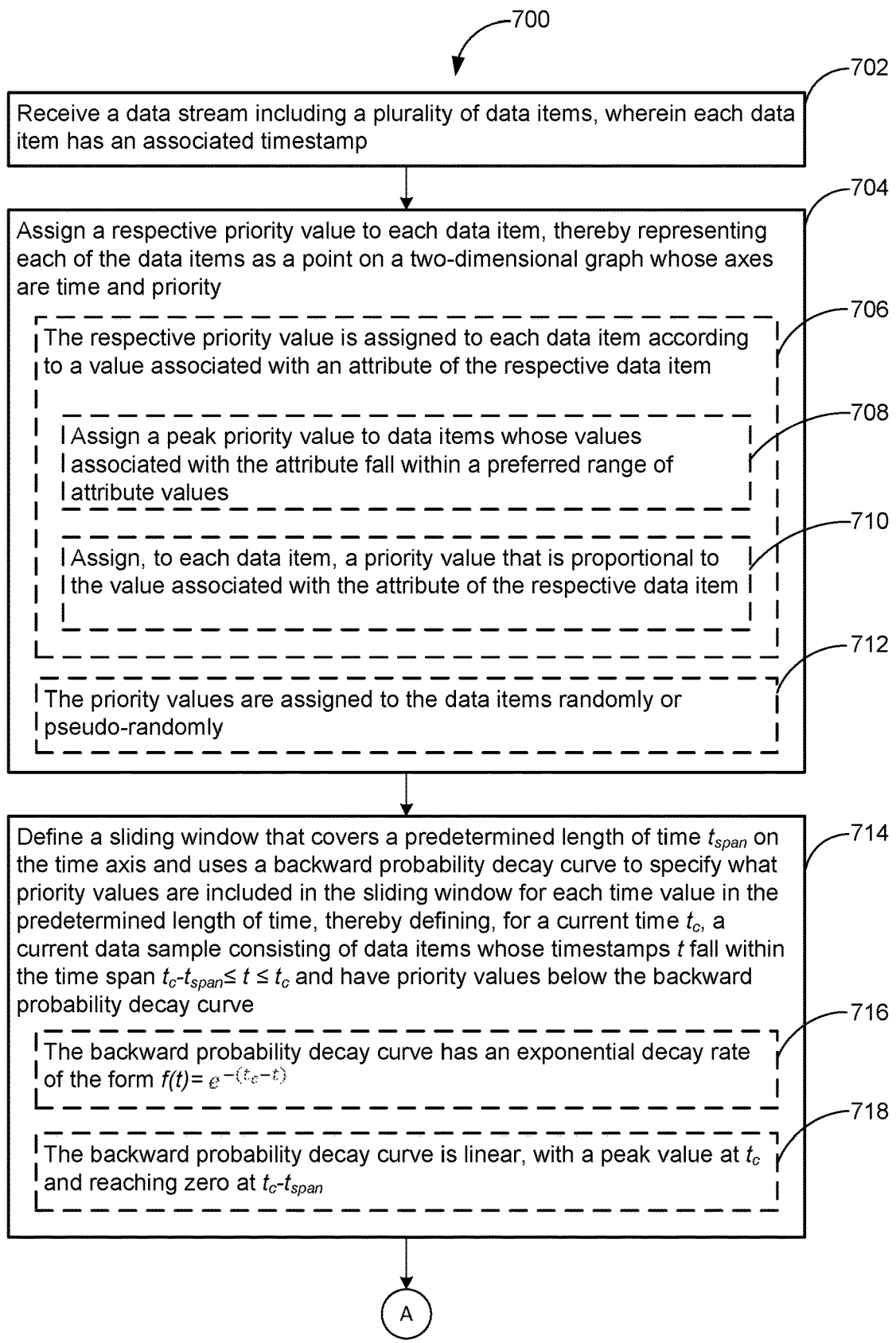
FIGS. 7A-7D provide a flowchart of a data sampling method in accordance with some implementations.
Figure 7B:
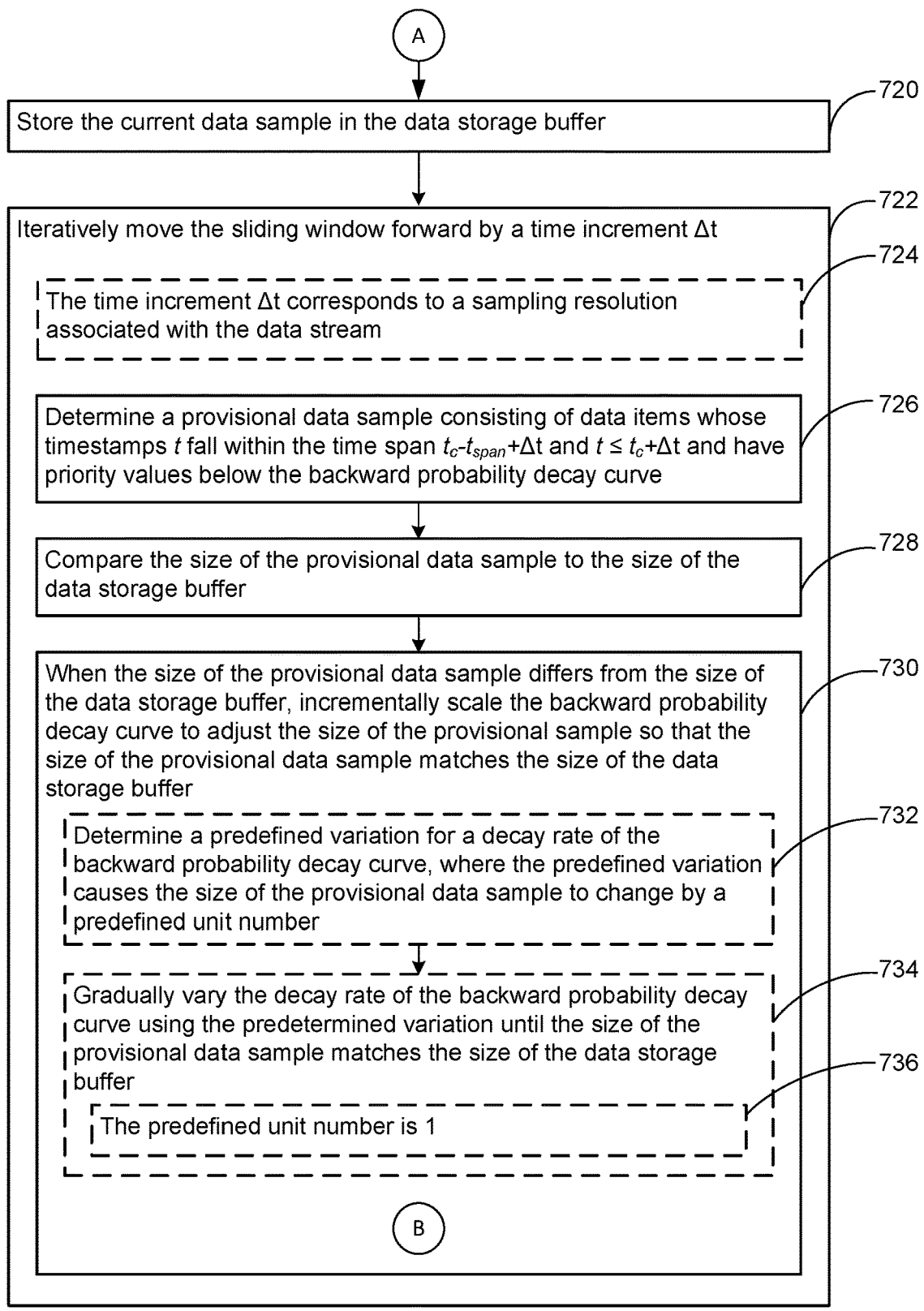
Figure 7C:
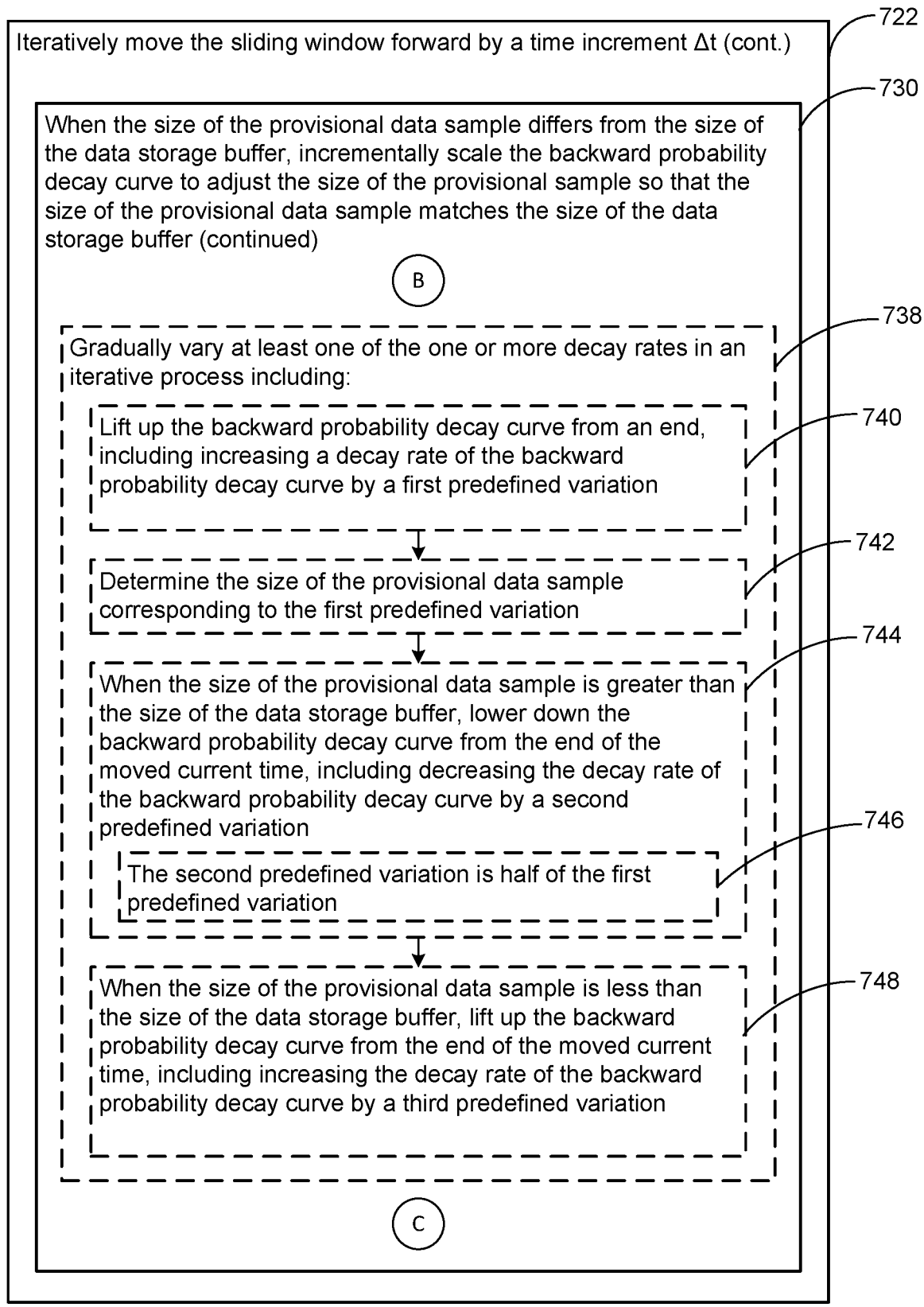
Figure 7D:
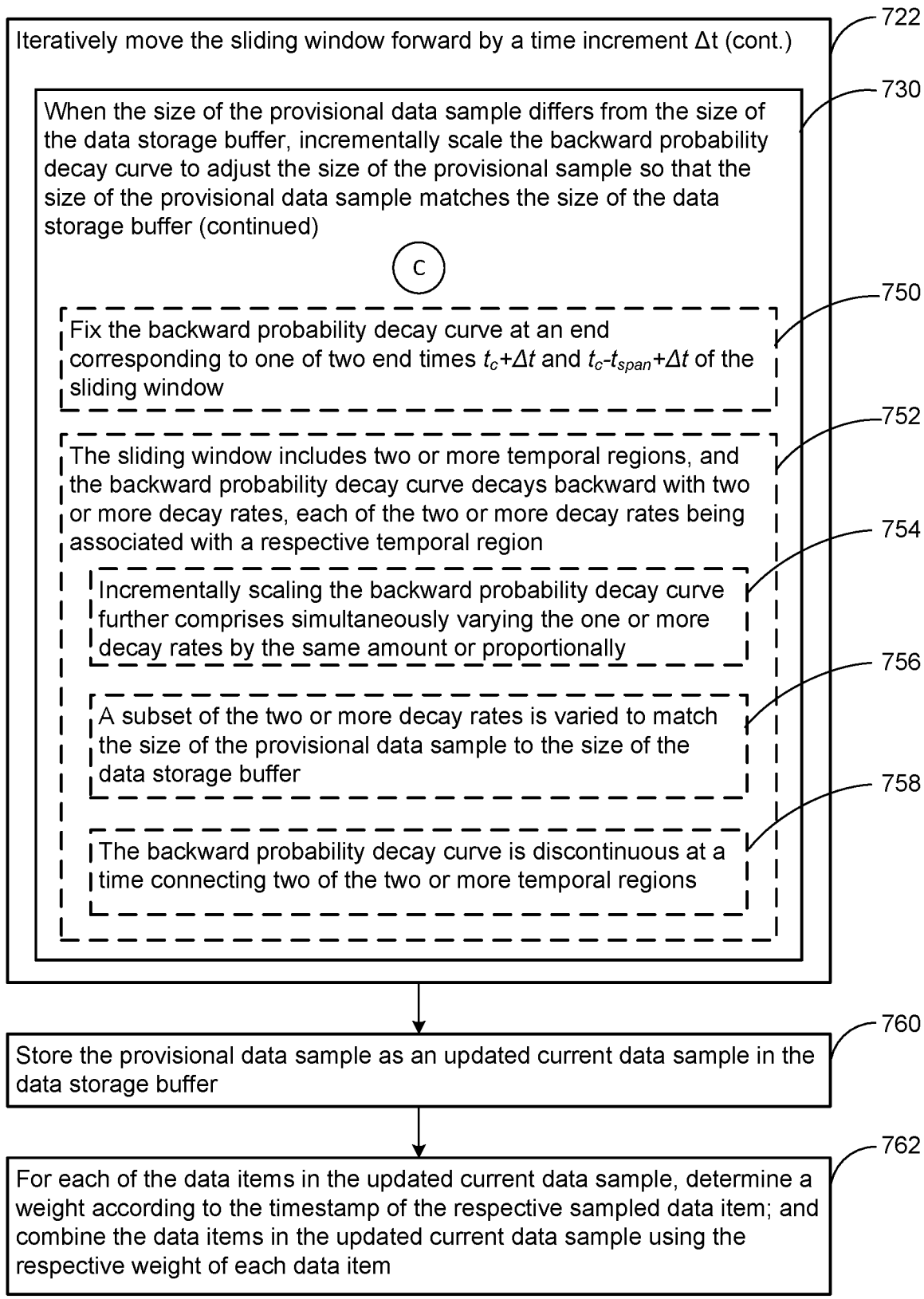
Figure 8A:
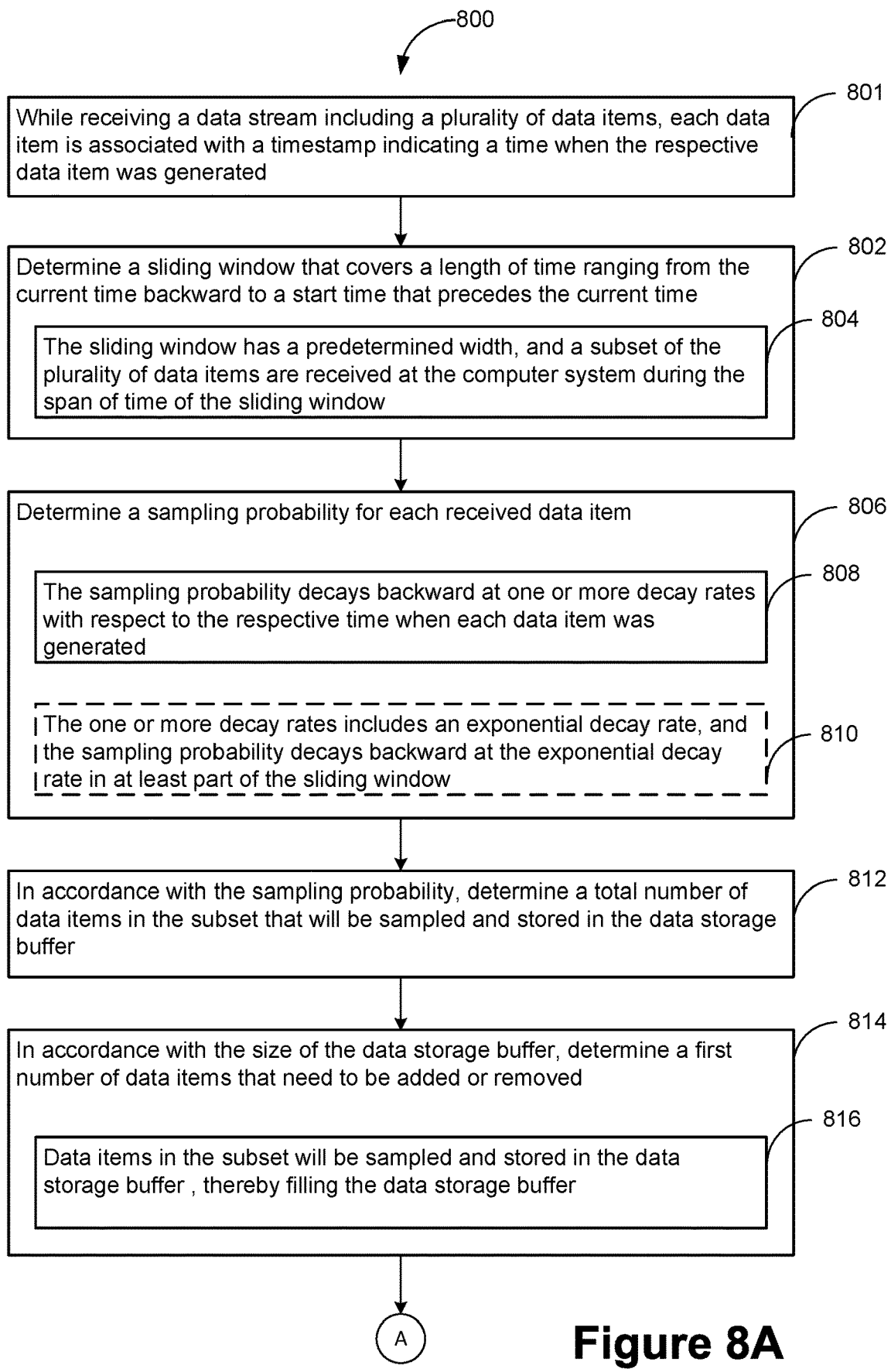
Figure 8B:
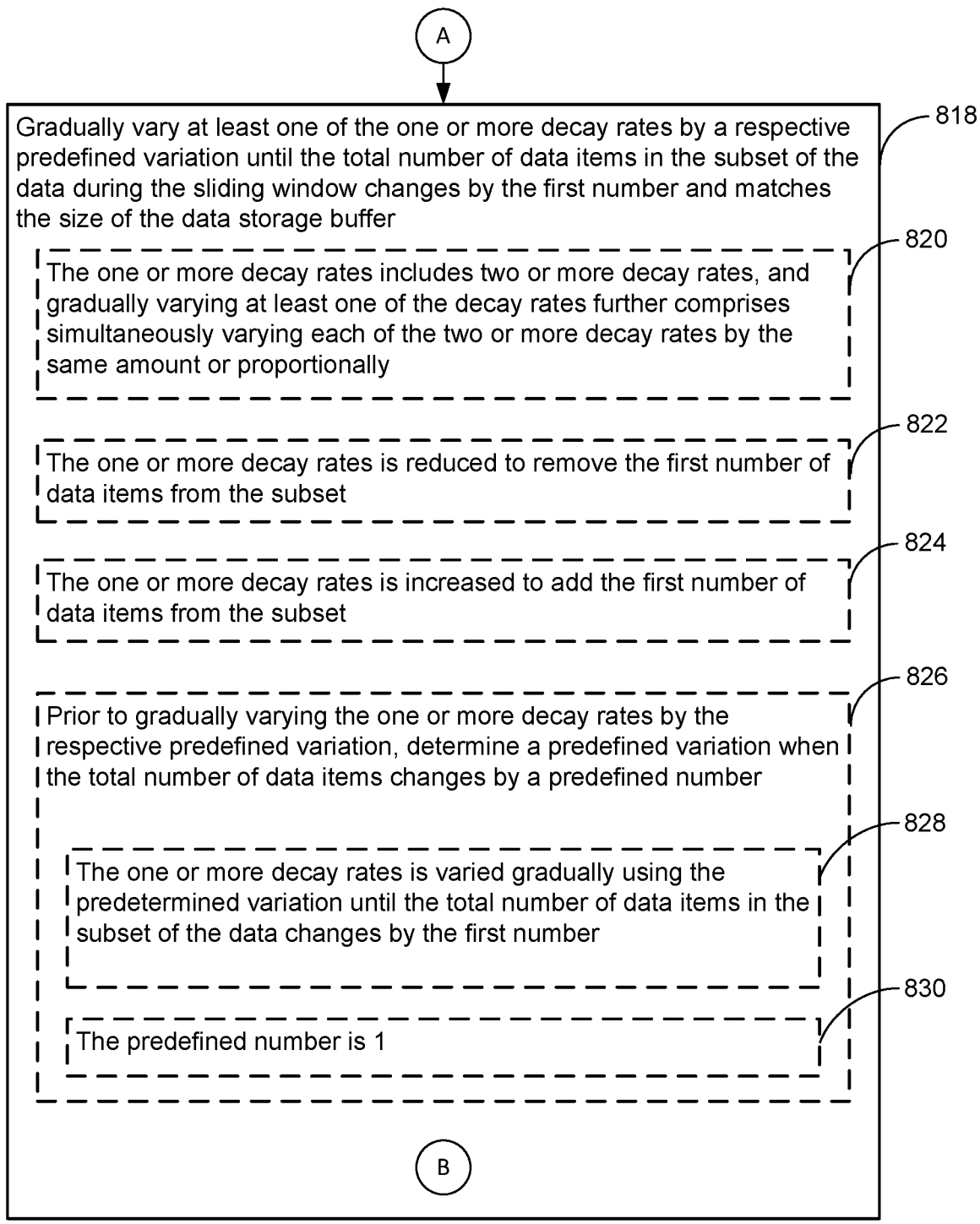
Figure 8D:
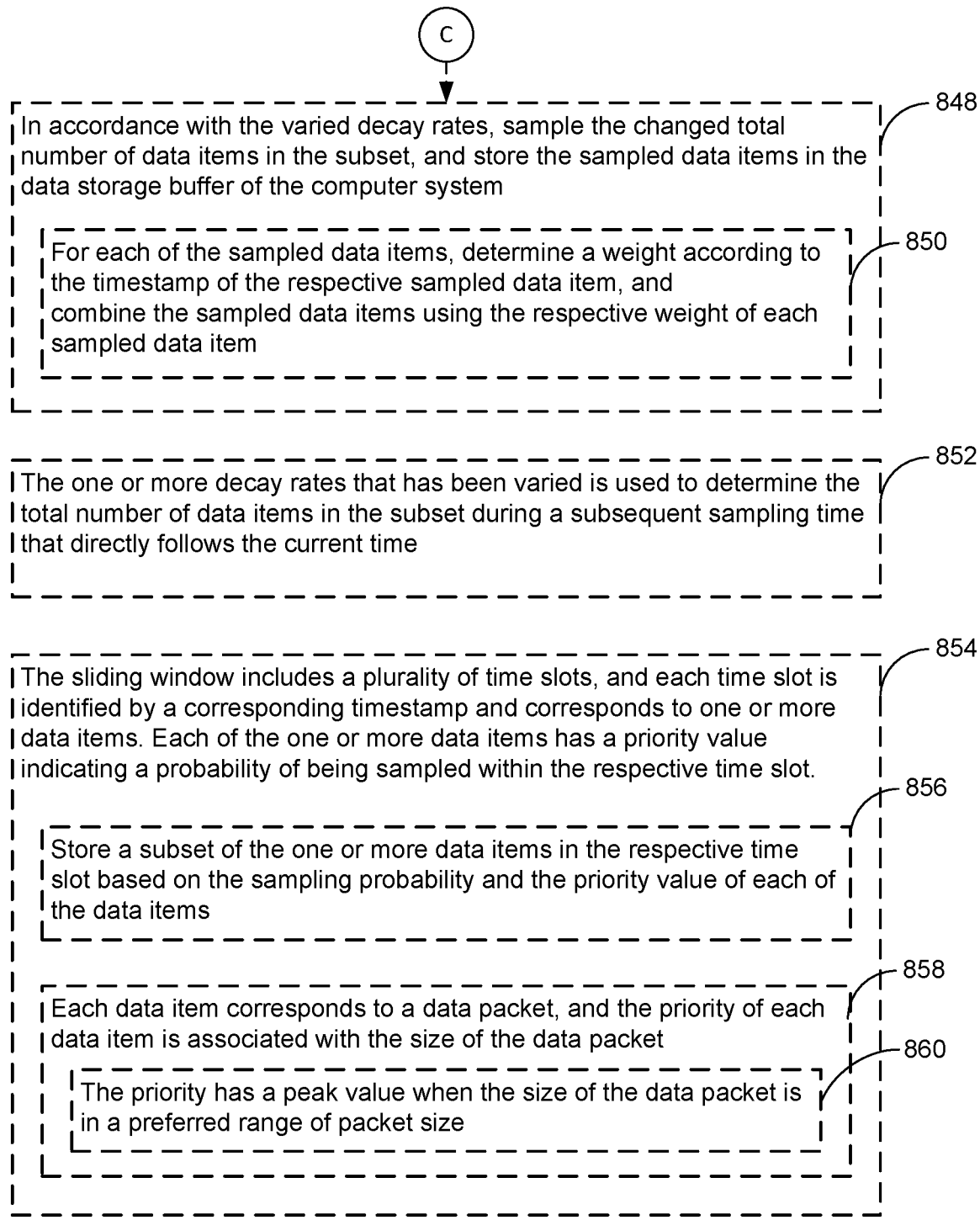

FIGS. 6A and 6B illustrate processes 600 and 650 of gradually varying a backward probability decay curve in a sliding window to match the size of the provisional data sample to the size of a data storage buffer in accordance with some implementations. As explained above, after shifting the sliding window and the backward probability decay curve forward by a time increment $\Delta t$, the computer system 200 determines a provisional data sample consisting of data items whose timestamps t fall within the time span $t_c-t_{span}+\Delta t \leq t \leq t_c+\Delta t$ and have priority values below the backward probability decay curve. The computer system 200 then determines the total number of data items that will be sampled and stored in the data storage buffer (i.e., the size of the provisional data sample). The total number of data items to be sampled is compared with a size of the data storage buffer to determine a first number of data items that need to be added or removed. The backward probability decay curve is incrementally adjusted (e.g., by gradually adjusting at least one of one or more decay rates of the backward probability decay curve), until the size of the provisional data sample changes by the first number and matches the size of the data storage buffer.

Referring to FIG. 6A, in some implementations, prior to gradually varying the one or more decay rates in the sliding window, the computer system 200 determines a predefined variation for at least one of the decay rates, when the total number of data items to be sampled changes by a predefined number (e.g., 1, 5, or 10). For example, the backward probability decay curve 602 is fixed at the start time $t_p+\Delta t$, and lifted up to the backward probability decay curve 604 to obtain an increase of 5 in the total number of data items to be sampled. Here, the decay rate of the backward probability decay curve 602 is increased by the predefined variation. Then, the decay rate of the backward probability decay curve 604 continues to be varied gradually (606) using the predetermined variation until the total number of data items in the subset of the data changes by the first number. It is noted that any subsequent variation of the decay rate results in an increase of the total number of data items. The updated current data sample consists of data items whose timestamps t fall within the time span $t_c-t_{span}+\Delta t \leq t \leq t_c+\Delta t$ and have priority values below a last backward probability decay curve 608.

In some implementations, the predefined variation of the decay rate is small. When the backward probability decay curve 602 is scaled incrementally and continuously according to the predefined variation of the decay rate, data items are moved above or below the curve 602 one by one. When the first number has been reached, the data sampling module 106 of the computer system 200 ceases scaling the backward probability decay curve 602.

Referring to FIG. 6B, in some implementations, incrementally scaling the backward probability decay curve uses an iterative process. For example, in accordance with the iterative process, the backward probability decay curve 652 varies to the curve 660 by way of a series of backward probability decay curves 654, 656, and 658. Specifically, the backward probability decay curve 652 is fixed at the start time $t_p+\Delta t$, and lifted up to the backward probability decay curve 654 by increasing its decay rate by a first predefined variation. Then, the computer system 200 determines the size and an associated variation of the provisional data sample (i.e., the total number of data items to be sampled) corresponding to the first predefined variation of the decay rate. When the size of the provisional data sample is greater than the size of the data storage buffer (i.e., the variation of the total number is greater than the first number), the decay rate of the backward probability decay curve 654 is reduced by a second predefined variation. In some implementations, the second predefined variation is scaled from the first predefined variation (e.g., ½ of the first predefined variation). Conversely, when the size of the provisional data sample is less than the size of the data storage buffer (i.e., the variation of the total number is less than the first number), the decay rate of the backward probability decay curve 654 is increased by a third predefined variation. In some implementations, the third predefined variation is scaled from the first predefined variation.

In this example, when the decay rate of the backward probability decay curve 654 is reduced by the second predefined variation to result in the backward probability decay curve 656, the size of the provisional data sample is determined in association with the first and second predefined variations of the decay rate of the backward probability decay curve. In accordance with a comparison of the size of the provisional data sample and the size of the data storage unit, the decay rate is continued to be varied by one or more predefined variations until the size of the provisional data sample matches the size of the data storage unit (e.g., differs by a number smaller than a threshold). Stated another way, the decay rate is continued to be varied until the variation of the total number of data items to be sampled is substantially close to the first number (e.g., different from the first number by a number less than a threshold, such as 1 or 5). When the variation of the total number of data items to be sampled matches the first number, the size of the provisional data sample matches the size of the data storage buffer, and the backward probability decay curve 660 is thereby used to select an updated current data sample for storage and further processing.

In some implementations, as time progresses, the sliding window continues to move to a subsequent sampling time that directly follows the current time $t_c+\Delta t$. The decay rate of the backward probability decay curve 660 is used to initiate the iterative process for determining and adjusting the total number of data items in the corresponding subset of received data items in the sliding window at the subsequent sampling time.

FIGS. 7A-7D provide a flow chart of a method 700 for selecting data samples in accordance with some implementations. In some implementations, the method 700 is performed by instructions that are stored on a non-transitory computer-readable storage medium and are executed by one or more processors of a computer system 200. Each of the operations shown in FIGS. 7A-7D may correspond to instructions stored in computer memory or on a non-transitory computer-readable storage medium (e.g., the memory 214 of the computer system 200). The computer-readable storage medium may include a magnetic or optical disk storage device, solid state storage devices such as flash memory, or other non-volatile memory device or devices. The instructions stored on the computer-readable storage medium may include one or more of: source code, assembly language code, object code, or other instruction format that is interpreted by one or more processors. Some operations in the method 700 may be combined and/or the order of some operations may be changed. The computer memory also includes a data storage buffer 112.

In accordance with the data sampling method 700, a data sampling module 106 of the computer system 200 receives (702) a data stream 102 including a plurality of data items 104, each of which has an associated timestamp. The computer system 200 assigns (704) a respective priority value to each data item, thereby representing each of the data items as a point on a two-dimensional graph whose axes are time and priority. Referring to FIGS. 3-6, in some implementations, a data item having a lower priority value is associated with a higher probability of being sampled.

In some implementations, each data item includes one or data elements that are structured and stored in a row of a database table. In some implementations, the respective priority value is assigned to each data item according to values of one or more of the data elements (e.g., a data element associated with a stock price). In some implementations, the respective priority value is assigned (706) to each data item according to an attribute of the data item (i.e., the value of the attribute). The respective priority value for each data item is assigned according to a value associated with the attribute of the respective data item. In some implementations, a peak priority value is assigned (708) to data items whose values associated with the attribute fall within a preferred range of attribute values. In some implementations, the respective priority value assigned to each data item is (710) proportional to the value associated with the attribute of the respective data item (e.g., size). In a specific example, each data item corresponds to a respective data packet, and assigning a respective priority value to each data item includes assigning the respective priority value to each data item according to the respective size of the respective data packet. In some implementations, a peak priority value is assigned to data items whose data packets have sizes that fall within a preferred range of packet size. In some implementations, the priority value assigned to each data item is proportional to the size of the respective data packet. In some implementations, the priority values are assigned (712) to the data items randomly or pseudo-randomly.

The computer system 200 defines (714) a sliding window that covers a predetermined length of time $t_{span}$ on the time axis and uses a backward probability decay curve (e.g., the curves 302-312 in FIGS. 3A-3D) to specify what priority values are included in the sliding window for each time value in the predetermined length of time. This defines, for a current time $t_c$, a current data sample consisting of data items whose timestamps t fall within the time span $t_c - t_{span} \leq t \leq t_c$ and have priority values below the backward probability decay curve. In some implementations, the backward probability decay curve has (716) an exponential decay rate of the form $f(t) = e^{(t_c - t)}$. Alternatively, the backward probability decay curve is linear (718), with a peak value at $t_c$ and reaching zero at $t_c - t_{span}$. More details on the backward probability decay curve are discussed above with reference to FIGS. 3A-3D.

The current data sample is stored (720) in the data storage buffer. Further, the sliding window is iteratively moved (722) forward by a time increment $\Delta t$. In some implementations, the time increment $\Delta t$ corresponds (724) to a sampling resolution associated with the data stream. The computer system 200 determines (726) a provisional data sample consisting of data items whose timestamps t fall within the time span $t_c - t_{span} + \Delta t \leq t \leq t_c + \Delta t$ and have priority values below the backward probability decay curve. The size of the provisional data sample is compared (728) to the size of the data storage buffer.

When the size of the provisional data sample differs from the size of the data storage buffer, the computer system incrementally scales (730) the backward probability decay curve to adjust the size of the provisional data sample so that the size of the provisional data sample matches the size of the data storage buffer. In some implementations, prior to incrementally scaling the backward probability decay curve, the computer system determines (732) a predefined variation for a decay rate of the backward probability decay curve, and the predefined variation is configured to cause the size of the provisional data sample to change by a predefined unit number. Then, the backward probability decay curve can be incrementally scaled by gradually varying (734) the decay rate of the backward probability decay curve using the predetermined variation until the size of the provisional data sample matches the size of the data storage buffer. In an example, the predefined unit number is 1.

In some implementations, the backward probability decay curve is incrementally scaled (738) by an iterative process in which a start end of the backward probability decay curve is fixed. The backward probability decay curve is lifted (740) up from an end to increase a decay rate of the backward probability decay curve by a first predefined variation. The size of the provisional data sample corresponding to the first predefined variation of the decay rate is then determined (742). When the size of the provisional data sample is greater than the size of the data storage buffer, the computer system lowers (744) down the backward probability decay curve from an end to decrease the decay rate of the backward probability decay curve by a second predefined variation. In an example, the second predefined variation is (746) half of the first predefined variation. Alternatively, when the size of the provisional data sample is less than the size of the data storage buffer, the computer system lifts (748) up the backward probability decay curve from an end to increase the decay rate of the backward probability decay curve by a third predefined variation. More details on the iterative process to incrementally scale the backward probability decay curve are explained above with reference to FIG. 6B.

In some implementations, at the time of incrementally scaling the backward probability decay curve, the computer system fixes (750) the backward probability decay curve at an end corresponding to one of one of two end times $t_c + \Delta t$ or $t_c - t_{span} + \Delta t$ of the sliding window.

In some implementations, the sliding window includes (752) two or more temporal regions, and the backward probability decay curve decays backward with two or more decay rates. Each of the two or more decay rates is associated with a respective temporal region. In some situations, to incrementally scale the backward probability decay curve, the one or more decay rates are simultaneously varied (754) by the same amount or proportionally. In some implementations, a subset of the two or more decay rates is varied (756) to match the size of the provisional data sample to the size of the data storage buffer. In some implementations, the backward probability decay curve is discontinuous (758) at a time connecting two of the two or more temporal regions.

Upon matching the size of the provisional data sample and the size of the data storage buffer, the computer system stores (760) the provisional data sample as an updated current data sample in the data storage buffer. In some implementations, a weight is determined (762) for each of the data items in the updated current data sample according to the timestamp of the respective sampled data item. The data items in the updated current data sample are then combined (762) using the respective weight of each data item.

It should be understood that the particular order in which the operations in FIGS. 7A-7D have been described is merely exemplary and are not intended to indicate that the described order is the only order in which the operations could be performed. One of ordinary skill in the art would recognize various ways to sample data as described herein. Additionally, it should be noted that details of other processes described with respect FIGS. 1-6 and 8 are also applicable in an analogous manner to the method 700 described above with respect to FIGS. 7A-7D. For brevity, these details are not repeated here.

In some implementations, each data item received has a sampling probability computed as a function of the associated timestamp. In some implementations, the function is related to or independent from the backward probability decay curve. A time or time slot corresponding to a specific timestamp may be associated with one or more data items, which share the same sampling probability. Each of the one or more data items also has a priority value configured to determine which one of the one or more data items is sampled given the same sampling probability. In some implementations, the priority value is assigned, and a lower priority value is associated with a higher probability of being sampled.

FIGS. 8A-8D provide a flow chart of a data sampling method 800 in accordance with some implementations. In some implementations, the method 800 is performed by instructions that are stored on a non-transitory computer-readable storage medium and are executed by one or more processors of a computer system 200. Each of the operations shown in FIGS. 8A-8D may correspond to instructions stored in computer memory or on a non-transitory computer-readable storage medium (e.g., the memory 214 of the computer system 200). The computer-readable storage medium may include a magnetic or optical disk storage device, solid state storage devices such as flash memory, or other non-volatile memory device or devices. The instructions stored on the computer-readable storage medium may include one or more of: source code, assembly language code, object code, or other instruction format that is interpreted by one or more processors. Some operations in the method 800 may be combined and/or the order of some operations may be changed. The computer memory also includes a data storage buffer.

In accordance with the data sampling method 800, a data sampling module 106 of the computer system 200 receives (801) a data stream including a plurality of data items. Each data item is associated with a timestamp indicating a time when the respective data item was generated. While receiving the data stream, the computer system 200 determines (802) a sliding window that covers a length of time ranging from the current time backward to a start time that precedes the current time. The sliding window has (804) a predetermined width, and a subset of the plurality of data items are received at the computer system during the time span of the sliding window. The computer system 200 determines (806) a sampling probability for each data item of the subset. The sampling probability decays (808) backward at one or more decay rates with respect to the respective time when each data item of the subset was generated. In some implementations, the decay rates (810) include an exponential decay rate, and the sampling probability decays backward at the exponential decay rate in at least part of the sliding window.

In accordance with the sampling probability, the computer system further determines (812) a total number of data items in the subset that will be sampled and stored in the data storage buffer. Further, in accordance with a size of the data storage buffer, the computer system 200 determines (814) a first number of data items that need to be added or removed. Data items in the subset will be sampled and stored (816) in the data storage buffer, thereby filling the data storage buffer.

After determining the first number, the computer system 200 gradually varies (818) at least one of the one or more decay rates by a respective predefined variation until the total number of data items in the subset of the data during the sliding window changes by the first number and matches the size of the data storage buffer. In some implementations, the one or more decay rates includes (820) two or more decay rates, and gradually varying at least one of the one or more decay rates further includes simultaneously varying each of the two or more decay rates by the same amount or proportionally. In some circumstances, the one or more decay rates is reduced (822) to remove the first number of data items from the subset. In some circumstances, the one or more decay rates is increased (824) to add the first number of data items from the subset.

In some implementations, prior to gradually varying the at least one of the one or more decay rates by the respective predefined variation, the computer system 200 determines (826) a predefined variation when the total number of data items changes by a predefined number. The one or more decay rates is varied (828) gradually using the predetermined variation until the total number of data items in the subset of the data changes by the first number. In an example, the predefined number is (830) 1. Thus, in some implementations, the one or more decay rates is varied gradually so that the total number of data items to be sampled is varied one by one until it matches the size of the data storage buffer.

In some implementations, the one or more decay rates are varied (834) according to an iterative process. During the iterative process, the sampling probability at the start time is fixed. In accordance with the iterative process, the computer system 200 increases (836) the one or more decay rates by a first predefined variation, and determines (838) a variation of the total number of data items corresponding to the first predefined variation. When the variation of the total number is greater than the first number, the computer system 200 decreases (840) the one or more decay rates by a second predefined variation. In an example, the second predefined variation is (842) half of the first predefined variation. When the variation of the total number is not greater than the first number, the computer system 200 increases (844) the one or more decay rates by a third predefined variation. More details on the iterative process are discussed above with reference to FIG. 6B.

In some implementations, the one or more decay rates are gradually (846) varied while the sampling probability at either the start time or the current time is held fixed.

In some implementations, in accordance with the varied decay rates, the computer system 200 samples the changed total number of data items in the subset, and stores the sampled data items in the data storage buffer of the computer system. Further, in some implementations, for each of the sampled data items, the computer system 220 determines (848) a weight according to the timestamp of the respective sampled data item, and combines (850) the sampled data items using the respective weight of each sampled data item.

In some implementations, the one or more decay rates that has been varied is used to determine (852) the total number of data items in the subset during a subsequent sampling time that directly follows the current time.

In some implementations, the sliding window includes (854) a plurality of time slots, and each time slot is identified by a corresponding timestamp and corresponds to one or more data items. Each of the one or more data items has a priority value indicating a probability of being sampled within the respective time slot. After gradually varying the one or more decay rates, the computer system 200 stores (856) a subset of the one or more data items in association with the respective time slot of the sliding window based on the sampling probability and the priority value of each of the subset of the one or more data items.

In some implementations, each data item includes one or data elements that are structured and stored in a row of a database table. In some implementations, the respective priority value is assigned to each data item according to a subset of the data elements (e.g., a data element associated with a stock price). In some implementations, the respective priority value is assigned to each data item according to a characteristic of the data item (i.e., the value of the characteristic). The respective priority value for each data item is assigned according to a value associated with the characteristic of the respective data item. In some implementations, a peak priority value is assigned to data items whose values associated with the characteristic fall within a preferred range of characteristic values. In some implementations, the respective priority value assigned to each data item is proportional to the value associated with the characteristic of the respective data item. In a specific example, each data item corresponds to (858) a data packet, and the priority of each data item is associated with the size of the data packet. In an example, the priority has (860) a peak value when the size of the data packet is in a preferred range of packet size. In some implementations, the data packets having sizes in the preferred range are sampled and stored prior to other data packets having sizes out of the preferred range.

It should be understood that the particular order in which the operations in FIGS. 8A-8D have been described is merely exemplary and are not intended to indicate that the described order is the only order in which the operations could be performed. One of ordinary skill in the art would recognize various ways to sample data as described herein. Additionally, it should be noted that details of other processes described with respect FIGS. 1-7 are also applicable in an analogous manner to the method 800 described above with respect to FIGS. 8A-8D. For brevity, these details are not repeated here.

The data sampling methods 700 and 800 generalize practical sampling algorithms for streams with time varying sampling probabilities, and allow for significant improvements upon existing state-of-the-art sampling methods. For example, in a bounded memory scheme, the data sampling methods 700 and 800 double the number of samples in the same amount of memory space compared with some existing sampling methods. Further, in some implementations (e.g., when a priority of a data item is used in addition a sampling probability), the data sampling methods can construct a practical without replacement sampling scheme for timestamp based sequences that has a tight optimal guarantee that it samples the minimum number of necessary items in expectation. For even small samples, the methods in this application beat a known rate optimal scheme which can use four times the space or more compared to the data sampling methods 700 and 800. Also, this application demonstrates a new sliding window sampling scheme and shows that it can answer questions over a greater range of window widths than existing methods while producing larger or more efficient samples.

Figure 9:
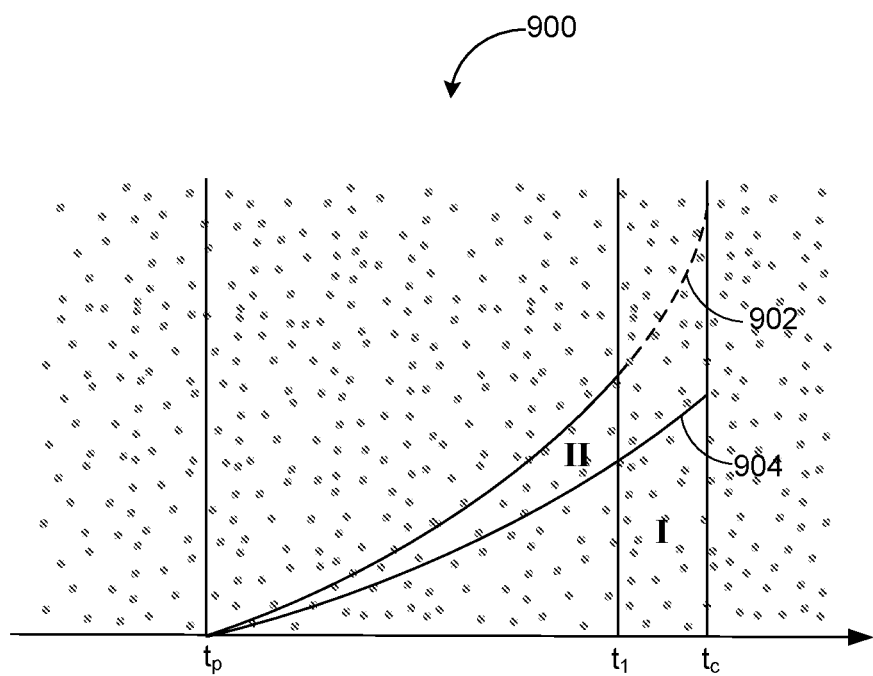
FIG. 9 is an example sliding windows that temporally expands in accordance with some implementations.

FIG. 9 illustrates a sliding window 900 that temporally expands in accordance with some implementations. In these implementations, the sliding window covers a length of time $t_{span}$ ranging from a current time $t_c$ backward to a start time $t_p$ that precedes the current time $t_c$. The length of time $t_{span}$ is not fixed. For example, the sliding window always starts from the same start time $t_p$, which is fixed, and the length of time $t_{span}$ expands as the current time $t_c$ progresses.

As a data stream is received at the computer system 200, only a subset of the data stream is sampled and stored in the data storage buffer. For example, at a first sampling time $t_1$ that immediately precedes the current time $t_c$, a first subset of data items in the data stream have priority values below the backward probability decay curve 902. These data items are sampled and stored in the data storage buffer. At the current time $t_c$, the computer system initially determines a backward probability decay curve 902 based on that used at the first sampling time $t_1$ (e.g., by extending the curve 902 from the first sampling time $t_1$ to the current time $t_c$). If the first subset of data items that has been sampled at the first sampling time filled the data storage buffer, any additional data item received between $t_1$ and $t_c$ will not be able to be stored in the data storage buffer. Rather, one or more decay rates of the backward probability decay curve 902 have to be reduced to allow part of the additional data items received between $t_1$ and $t_c$ (e.g., the data items in region I) to be sampled and stored. Now, part of the subset of the data stream that was sampled at the first sampling time $t_1$ (e.g., the data items in region II) has to be purged from the data storage buffer.

At the current time $t_c$, while receiving the data stream including a plurality of data items, the computer system 200 determines the sliding window 900 that covers a length of time ranging from $t_p$ to $t_c$, and a provisional backward probability decay curve 902 for each data item received at a respective time between $t_p$ and $t_c$. The provisional backward probability decay curve 902 decays backward at one or more decay rates with respect to the respective time when each data item is generated. In accordance with the provisional probability decay curve 902, the computer system 200 determines a total number of data items that will be sampled and stored in the data storage buffer in association with the sliding window 900 (i.e., a size of a provisional data sample associated with the curve 902). In accordance with the size of the data storage buffer, the computer system 200 further determines a first number of data items that need to be added to or removed from the provisional data sample. The resulting data items will be sampled and stored in the data storage buffer. Then, the computer system 200 gradually varies at least one of the one or more decay rates until the total number of data items to be sampled during the sliding window 900 changes by the first number and matches the size of the data storage buffer. An example of the backward probability decay curve is the curve 904.

In some implementations, the backward probability decay curves 902 and 904 drop to a predetermined fixed probability value. Further, in some implementations, the predetermined fixed probability value is zero or below a probability threshold that is substantially low at the start time $t_p$, such that few data items (if any) are stored at or immediately after the start time $t_p$. In some implementations, the one or more decay rates include a single decay rate (i.e., linear) or nonlinear (e.g., exponential or parabolic). In some implementations, the one or more decay rates include two or more decay rates, each of which is linear or non-linear. The sampling probability can be continuous or discontinuous in the sliding window 900.

It should be understood that details of other processes described with respect to FIGS. 1-8 are also applicable in an analogous manner to the data sampling process described with reference to FIG. 9. For brevity, these details are not repeated here.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of data sampling, comprising:
   at a computer system having one or more processors and memory storing one or more programs configured for execution by the one or more processors, wherein a portion of the memory is allocated as a data storage buffer:
   receiving a data stream including a plurality of data items, wherein each data item has an associated timestamp, and assigning a respective priority value to each data item, thereby representing each of the data items as a point on a two-dimensional graph whose axes are time and priority;
   defining a sliding window that covers a predetermined length of time $t_{span}$ on the time axis and uses a backward probability decay curve to specify what priority values are included in the sliding window for each time value in the predetermined length of time, thereby defining, for a current time $t_c$, a current data sample consisting of data items whose timestamps t fall within the time span $t_c-t_{span} \leq t \leq t_c$ and have priority values below the backward probability decay curve;
   storing the current data sample in the data storage buffer; and
   iteratively moving the sliding window forward by a time increment $\Delta t$, including:
      determining a provisional data sample consisting of data items whose timestamps t fall within the time span $t_c-t_{span}+\Delta t \leq t \leq t_c+\Delta t$ and have priority values below the backward probability decay curve;
      comparing a size of the provisional data sample to a size of the data storage buffer;
      when the size of the provisional data sample differs from the size of the data storage buffer, incrementally scaling the backward probability decay curve to adjust the size of the provisional data sample included in the sliding window so that the size of the provisional data sample matches the size of the data storage buffer; and
      storing the provisional data sample as an updated current data sample in the data storage buffer.

2. The method of claim 1, wherein assigning a respective priority value to each data item comprises assigning priority values according to sizes of the data items.

3. The method of claim 2, wherein assigning a respective priority value to each data item comprises assigning a peak priority value to data items whose sizes fall within a preferred range of sizes.

4. The method of claim 2, wherein assigning a respective priority value to each data item comprises assigning, to each data item, a respective priority value that is proportional to the respective size of the respective data item.

5. The method of claim 2, wherein each data item corresponds to a respective row in a database table, and the respective size of each data item is specified by a column in the database table.

6. The method of claim 1, wherein the priority values are assigned to the data items randomly or pseudo-randomly.

7. The method of claim 1, wherein the backward probability decay curve is continuous and monotonically increasing.

8. The method of claim 1, wherein the backward probability decay curve has an exponential decay rate of the form $f(t)=e^{-(t_c-t)}$.

9. The method of claim 1, wherein the backward probability decay curve is linear, with a peak value at $t_c$ and reaching zero at $t_c-t_{span}$.

10. The method of claim 1, further comprising:
    for each of the data items in the updated current data sample, determining a weight according to the timestamp of the respective data item; and
    combining the data items in the updated current data sample using the respective weight of each data item.

11. The method of claim 1, further comprising:
    prior to incrementally scaling the backward probability decay curve, determining a predefined variation for a decay rate of the backward probability decay curve, the predefined variation selected to cause the size of the provisional data sample to change by a predefined unit number;
    wherein incrementally scaling the backward probability decay curve further includes gradually varying the decay rate of the backward probability decay curve using the predetermined variation until the size of the provisional data sample matches the size of the data storage buffer.

12. The method of claim 1, wherein incrementally scaling the backward probability decay curve comprises an iterative process further including:
    lifting up the backward probability decay curve from one end of the moved sliding window, including increasing a decay rate of the backward probability decay curve by a first predefined variation;
    determining the size of the provisional data sample corresponding to the first predefined variation of the decay rate;
    in accordance with a determination that the size of the provisional data sample is greater than the size of the data storage buffer, lowering down the backward probability decay curve from the one end, including decreasing the decay rate of the backward probability decay curve by a second predefined variation; and
    in accordance with a determination that the size of the provisional data sample is less than the size of the data storage buffer, lifting up the backward probability decay curve from the one end, including increasing the decay rate of the backward probability decay curve by a third predefined variation.

13. The method of claim 12, wherein the second predefined variation is half of the first predefined variation.

14. The method of claim 1, wherein incrementally scaling the backward probability decay curve further comprises:
    fixing the backward probability decay curve at one of two end times $t_c+\Delta t$ and $t_c-t_{span}+\Delta t$ of the sliding window.

15. The method of claim 1, wherein the time increment $\Delta t$ corresponds to a sampling resolution associated with the data stream.

16. The method of claim 1, wherein the sliding window includes two or more temporal regions, and the backward probability decay curve decays backward with two or more decay rates, each of the two or more decay rates being associated with a respective temporal region.

17. The method of claim 16, wherein incrementally scaling the backward probability decay curve further comprises simultaneously varying the two or more decay rates by a same single proportionality factor.

18. The method of claim 16, wherein a subset of the two or more decay rates is varied to match the size of the provisional data sample to the size of the data storage buffer.

19. A computer system having one or more computing devices, each computing device having one or more processors and memory, wherein the memory stores one or more programs configured for execution by the one or more processors, wherein a portion of the memory is allocated as a data storage buffer, the one or more programs comprising instructions for:

receiving a data stream including a plurality of data items, wherein each data item has an associated timestamp, and assigning a respective priority value to each data item, thereby positioning each of the data items on a two-dimensional graph whose axes are time and priority;

defining a sliding window that covers a predetermined length of time $t_{span}$ on the time axis and uses a backward probability decay curve to specify what priority values are included in the sliding window for each time value in the predetermined length of time, thereby defining, for a current time $t_c$, a current data sample consisting of data items whose timestamps t fall within the time span $t_c-t_{span} \leq t \leq t_c$ and have priority values below the backward probability decay curve;

storing the current data sample in the data storage buffer; and iteratively moving the sliding window forward by a time increment $\Delta t$, including:

determining a provisional data sample consisting of data items whose timestamps t fall within the time span $t_c-t_{span}+\Delta t \leq t \leq t_c+\Delta t$ and have priority values below the backward probability decay curve;

comparing a size of the provisional data sample to a size of the data storage buffer;

when the size of the provisional data sample differs from the size of the data storage buffer, incrementally scaling the backward probability decay curve to adjust the size of the provisional data sample included in the sliding window so that the size of the provisional data sample matches the size of the data storage buffer; and storing the provisional data sample as an updated current data sample in the data storage buffer.

20. A non-transitory computer readable storage medium storing one or more programs configured for execution by a computer system having one or more processors and memory, wherein a portion of the memory is allocated as a data storage buffer, the one or more programs comprising instructions for:

receiving a data stream including a plurality of data items, wherein each data item has an associated timestamp, and assigning a respective priority value to each data item, thereby positioning each of the data items on a two-dimensional graph whose axes are time and priority;

defining a sliding window that covers a predetermined length of time $t_{span}$ on the time axis and uses a backward probability decay curve to specify what priority values are included in the sliding window for each time value in the predetermined length of time, thereby defining, for a current time $t_c$, a current data sample consisting of data items whose timestamps t fall within the time span $t_c-t_{span} \leq t \leq t_c$ and have priority values below the backward probability decay curve;

storing the current data sample in the data storage buffer; and iteratively moving the sliding window forward by a time increment $\Delta t$, including:

determining a provisional data sample consisting of data items whose timestamps t fall within the time span $t_c-t_{span}+\Delta t \leq t \leq t_c+\Delta t$ and have priority values below the backward probability decay curve;

comparing a size of the provisional data sample to a size of the data storage buffer;

when the size of the provisional data sample differs from the size of the data storage buffer, incrementally scaling the backward probability decay curve to adjust the size of the provisional data sample included in the sliding window so that the size of the provisional data sample matches the size of the data storage buffer; and storing the provisional data sample as an updated current data sample in the data storage buffer.

\* \* \* \* \*